US009366927B2

(12) United States Patent
Jung

(10) Patent No.: US 9,366,927 B2
(45) Date of Patent: Jun. 14, 2016

(54) LIQUID CRYSTAL DISPLAY AND METHOD OF FABRICATING THE SAME

(71) Applicant: LG DISPLAY CO., LTD., Seoul (KR)

(72) Inventor: Sunghun Jung, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 190 days.

(21) Appl. No.: 14/108,674

(22) Filed: Dec. 17, 2013

(65) Prior Publication Data

US 2014/0240630 A1 Aug. 28, 2014

(30) Foreign Application Priority Data

Feb. 27, 2013 (KR) ........................ 10-2013-0020990

(51) Int. Cl.
  *G02F 1/136* (2006.01)
  *G02F 1/1362* (2006.01)
  *G02F 1/1345* (2006.01)
  *G02F 1/1333* (2006.01)

(52) U.S. Cl.
  CPC ...... *G02F 1/136286* (2013.01); *G02F 1/13452* (2013.01); *G02F 1/13458* (2013.01); *G02F 1/1345* (2013.01); *G02F 2001/133357* (2013.01); *G02F 2001/133388* (2013.01)

(58) Field of Classification Search
  CPC ............ G02F 1/13452; G02F 1/13458; G02F 1/1345; G02F 2001/133357; G02F 2001/133388; G02F 1/136286
  See application file for complete search history.

(56) References Cited

U.S. PATENT DOCUMENTS

| 2002/0105263 | A1* | 8/2002 | Kim | 313/498 |
| 2004/0129943 | A1 | 7/2004 | Yoo et al. | |
| 2004/0152320 | A1* | 8/2004 | Kim et al. | 438/689 |
| 2010/0149473 | A1* | 6/2010 | Guo | G02F 1/1345 349/122 |
| 2011/0177639 | A1* | 7/2011 | Kang et al. | 438/34 |
| 2015/0060806 | A1* | 3/2015 | Park et al. | 257/40 |

FOREIGN PATENT DOCUMENTS

| CN | 1368718 A | 9/2002 |
| CN | 1514468 A | 7/2004 |
| CN | 1687838 A | 10/2005 |
| CN | 101211084 A | 7/2008 |
| EP | 1939673 A1 | 7/2008 |

OTHER PUBLICATIONS

Extended European Search Report issued in corresponding European Patent Application No. 13195527.0, mailed Jun. 3, 2014, 7 pages.
Office Action dated Mar. 4, 2016 for corresponding Chinese Patent Application No. 201310695617.5, 21 pages.

* cited by examiner

*Primary Examiner* — Ryan Crockett
(74) *Attorney, Agent, or Firm* — Brinks Gilson & Lione

(57) ABSTRACT

A liquid crystal display in which an organic passivation layer is partially removed and a method of fabricating the same are provided. The liquid crystal display comprises: an active area and a pad area. The pad area comprising: a first pad area where first pads connected to the data lines and bonded to output terminals of a drive IC are formed; a second pad area where second pads bonded to an input terminals of the drive IC are bonded; and a third pad area where third pads bonded to output terminals of the FPC are formed.

16 Claims, 27 Drawing Sheets

Middle portion of output area of D-IC

LIQUID CRYSTAL DISPLAY AND METHOD OF FABRICATING THE SAME

This application claims the benefit of priority to Korean Patent Application No. 10-2013-0020990 filed on Feb. 27, 2013, which is incorporated herein by reference for all purposes as if fully set forth herein.

BACKGROUND

1. Field

This document relates to a liquid crystal display in which an organic passivation film is partially removed from a pad area, and a method of fabricating the same.

2. Related Art

A high-resolution liquid crystal display uses an organic passivation film as its passivation film. The organic passivation film can reduce the parasitic capacitance of a display panel because it generally has a lower dielectric constant and is thicker compared to an inorganic passivation film.

In general, a pad area, as well as an active area, of a display panel where an image is displayed, is covered with the organic passivation film. In the active area, data lines and gate lines cross each other, and pixels are arranged in a matrix defined by a crossing structure of the data lines and the gate lines.

The pad area of the display panel may be divided into a first pad area to which output terminals of a drive IC (Integrated Circuit) are bonded, a second pad area to which input terminals of the drive IC are bonded, and a third pad area to which output terminals of an FPC (Flexible Printed Circuit) are bonded. Data pads are formed in the first pad area. The data pads are connected one-to-one to the data lines and bonded to the output terminals of the drive IC to transfer a data voltage output from the drive IC to the data lines. Pads formed in the third pad area are connected to ends of wires and bonded to the output terminals of the FPC. The wires are formed in a line pattern running across between the second pad area and the third pad area. The wires connect the input terminals of the drive IC and the output terminals of the FPC on a 1:2 basis. The same signal can be supplied to M (M is a positive integer equal to or greater than 1) through N output terminals (N is a positive integer equal to or greater than 1) of the FPC. In this case, the wires connect the input terminals of the drive IC and the output terminals of the FPC on an M:N basis.

The input/output terminals of the drive ICs and the output terminals of the FPCs are bonded to the pad area by an ACF (anisotropic conductive film). In an AFC bonding process, the ACF is placed on the pad area, a drive IC or FPC is aligned over the ACF, heat is applied to the ACF, and then the terminals of the drive IC or FPC are pressed against the ACF. Whether the bonding of the terminals of the drive IC or FPC and the pads is defective or not is determined based on the indentations formed in the pads. Since the terminals of the drive IC or FPC are pressed on the pads, with the ACF interposed between them, in the ACF bonding process, metal powder (or conductive balls) in the ACF forms indentations in the bonded parts of the data pads.

On the display panel where an organic passivation film is formed in the pad area, the organic passivation film PAC is partially removed from the pad area in order to open part of the pads, as shown in FIGS. 1 and 2. By the way, the organic passivation film PAC remaining in the pad area is formed thickly between the pads, and therefore no indentations, or only small indentations, if any, are formed after the driving IC bonding process. This makes it hard to ensure that the bonding between the pads and the terminals of the drive IC is done properly.

If no indentations, or only small indentations, if any, are formed, the bonding between the data pads and the drive IC or FPC is deemed defective and a repair process can be carried out. In the repair process, heat is applied to the pad area of the display panel and then the drive IC or FPC are pushed with a stick to separate the drive IC or FPC from the pad area of the display panel. However, when separating the drive IC or FPC from the pad area of the display panel in the repair process, a transparent electrode pattern formed on the pads or a metal pattern under it may be stripped off and lost. In this case, repair cannot be done, so the display panel should be discarded. The transparent electrode material may be ITO (Indium Tin Oxide).

FIG. 1 is a cross-sectional view showing a data pad to which a drive IC is bonded and an organic passivation film neighboring the data pad.

Referring to FIG. 1, the data pad comprises a gate metal pattern GM formed on a substrate SUBS and a transparent electrode pattern ITO formed over the gate metal pattern GM. A thick organic passivation film PAC is formed between pads. In FIG. 1, 'GI' is a gate insulating film formed on the substrate so as to cover the gate metal pattern GM. The gate metal pattern is connected to data lines of a display panel. 'BPAS' is a buffer passivation film made of an inorganic insulating material between the gate insulating film G1 and the organic passivation film PAC. 'PAS' is an upper passivation film made of an inorganic insulating material and covering the organic passivation film PAC. 'DBUMP' is an output terminal of the drive IC. The output terminal of the drive IC is brought into contact with the transparent electrode pattern ITO.

In the drive IC bonding process, if there is any misalignment at all between the output terminal DBUMP of the drive IC and the pad, no indentations or only small indentations, if any, are formed due to the thick organic passivation film PAC, and therefore the bonding is deemed defective. When separating the drive IC from the data pad during the repair process, the transparent electrode pattern ITO and the gate metal pattern GM may be stripped off and lost, as shown in FIG. 2. In this case, the display panel cannot be repaired and should be discarded.

A pad to which an output terminal of an FPC is bonded has a parallel structure that connects a gate metal pattern and a source-drain metal pattern, and can be formed in the output area of the FPC. If there is any misalignment at all between the output terminal of the FPC and the pad having the parallel structure, no indentations or only small indentations, if any, are formed due to the thick organic passivation film, and therefore the bonding is deemed defective. When separating the FPC from the pad having the parallel structure during the repair process, the gate metal pattern and the source-drain metal pattern may be stripped off and lost. In this case, the display panel cannot be repaired and should be discarded.

SUMMARY

A liquid crystal display comprises: an active area where data lines and gate lines cross each other and pixels are arranged in a matrix type; and a pad area where a drive IC and an FPC are bonded to supply signals to the active area, the pad area comprising: a first pad area where first pads connected to the data lines and bonded to output terminals of the drive IC are formed; a second pad area where second pads bonded to input terminals of the drive IC are bonded; and a third pad area where third pads bonded to output terminals of the FPC are formed, where the second pads and the third pads are connected through wires, and some part of the pad area, excluding the first pad area, second pad area, and third pad area, and the active area are covered with an organic passivation film.

A method of fabricating a liquid crystal display comprises: forming a gate metal on a substrate in an active area and a pad area and patterning the same to form gate metal patterns in the active area and the pad area; forming a gate insulating film in the active area and the pad area so as to cover the gate metal patterns in the active area and the pad area, forming a semiconductor layer over the gate insulating film, and patterning the same to form semiconductor patterns on the gate insulating film; forming a source-drain metal in the active area and the pad area so as to cover the semiconductor patterns and patterning the same to form source-drain metal patterns in the active area and the pad area; forming a buffer passivation film in the active area and the pad area so as to cover the source-drain metal patterns in the active area and the pad area, forming an organic passivation film over the buffer passivation film, and patterning the same to remove the organic passivation film from part of the pad area and leave the organic passivation film in the remaining pad area and the active area; forming a transparent electrode material in the active area and the pad area and patterning the same to form first transparent electrode patterns in the active area and the pad area; forming an upper passivation film in the active area and the pad area so as to cover the first transparent electrode patterns in the active area and the pad area and patterning the same; and forming a transparent electrode material in the active area and the pad area and patterning the same to form second transparent electrode patterns in the active area and the pad area.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 1:
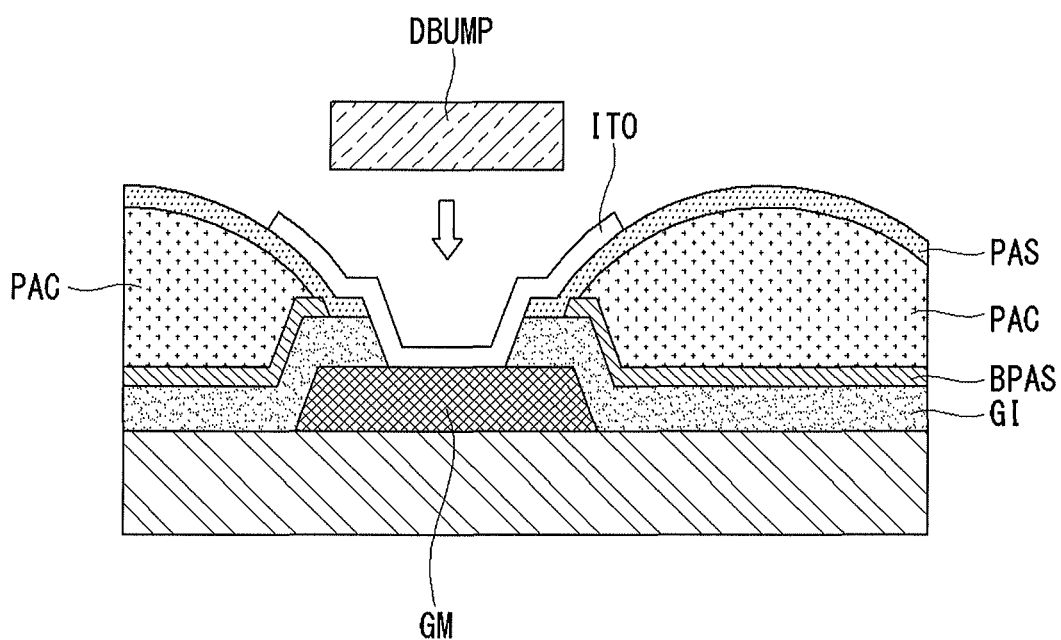
FIG. 1 is a cross-sectional view showing a data pad to which a drive IC is bonded and an organic passivation film neighboring the data pad.
Figure 2:
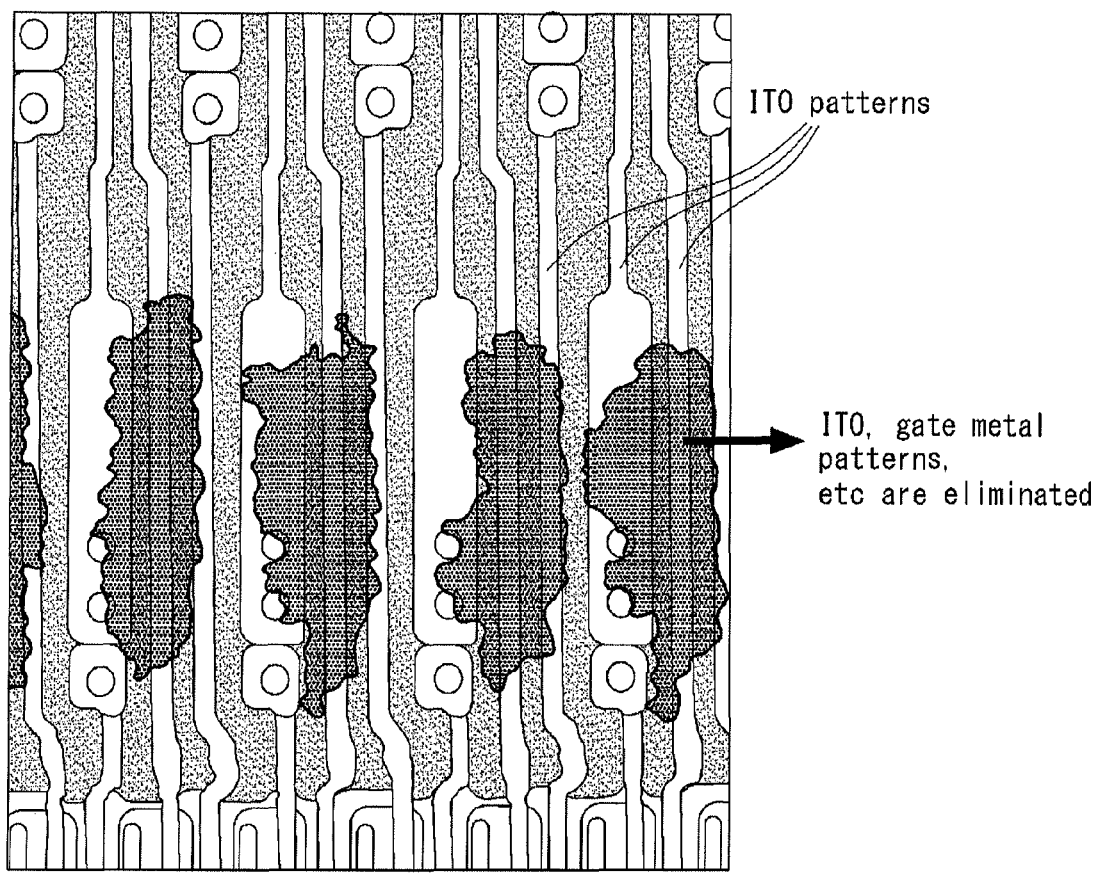
FIG. 2 is an optical microscope photographic image showing an example of the loss of a transparent electrode pattern and a gate metal pattern when separating drive ICs from data pads during a repair process.
Figure 3:
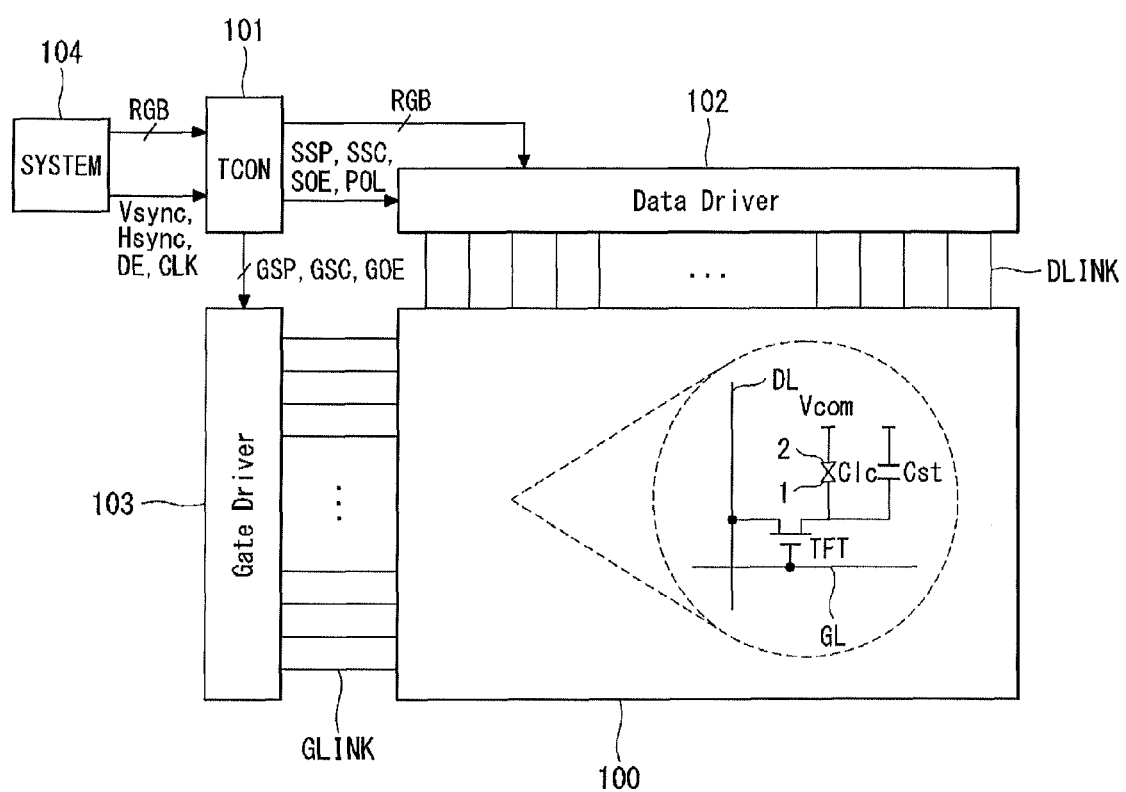
FIG. 3 is a block diagram showing a liquid crystal display according to an exemplary embodiment of the present invention.

Referring to FIG. 3, a liquid crystal display according to an exemplary embodiment of the present invention comprises a liquid crystal display panel 100, a timing controller 101, a data driver 102, and a gate driver 103.

A liquid crystal layer of the liquid crystal display panel 100 is formed between two substrates. An active area of the liquid crystal display panel 100 comprises pixels, which are arranged in a matrix according to a crossing structure of data line DL and gate lines GL. Each pixel comprises a liquid crystal cell Clc.

A TFT array is formed in the active area on the lower substrate of the liquid crystal display panel 100. The TFT array comprises liquid crystal cells Clc formed at the crossings of the data lines DL and the gate lines GL, TFTs connected to pixel electrodes 1 of the liquid crystal cells, storage capacitors Cst, etc. Data links DLINK are connected one-toone to the data lines DL. Data pads (not shown) are connected to ends of the data links DLINK. Gate links GLINK are connected one-to-one to the gate lines GL, and gate pads (not shown) are connected to ends of the gate links GLINK.

Figure 7:
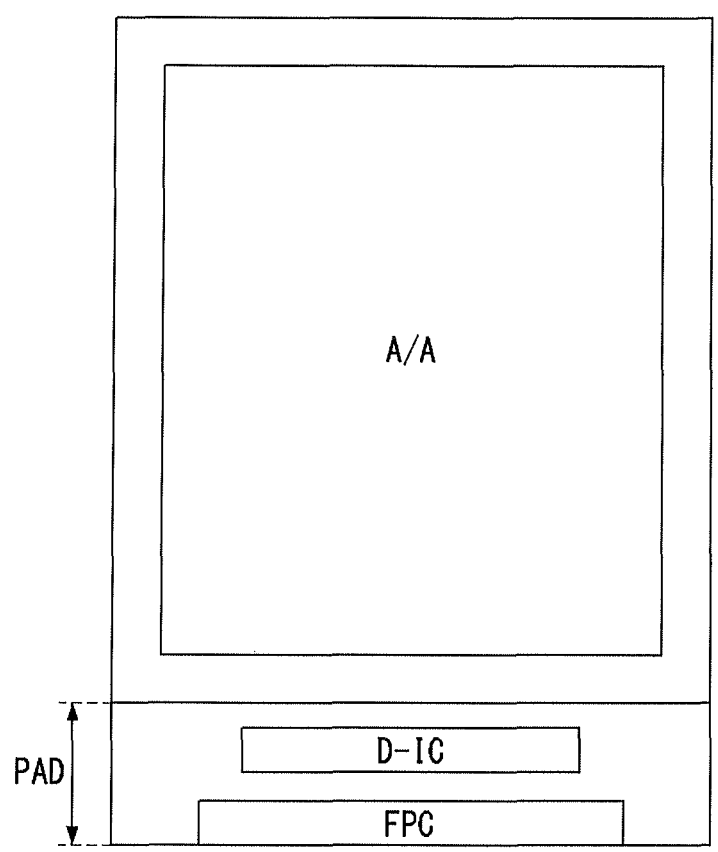
FIG. 7 is a top plan view showing a display structure of a mobile information terminal.
Figure 8:
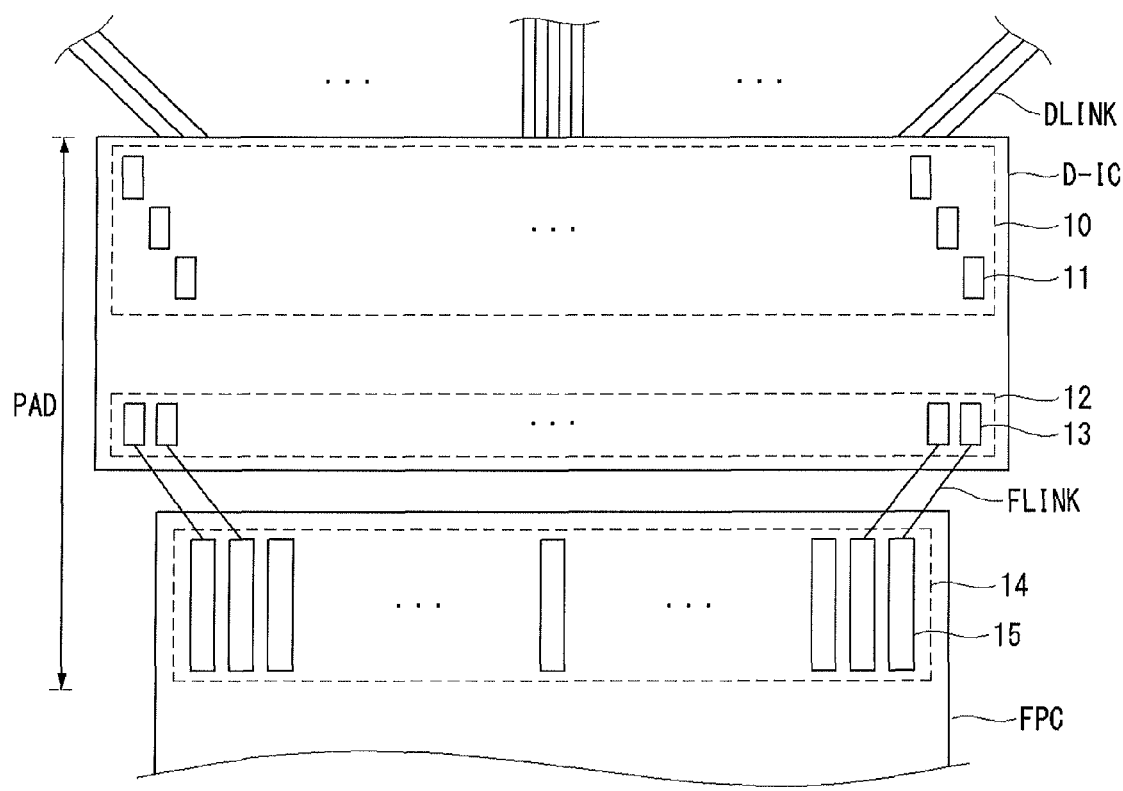
FIG. 8 is a top plan view showing in detail the pad area of FIG. 7.

A pad area may be arranged under the active area, as shown in FIGS. 7 and 8, in the case of a mobile information terminal. The position and size of the pad area may vary depending on the product to which the liquid crystal display panel 100 applies.

Figure 4:
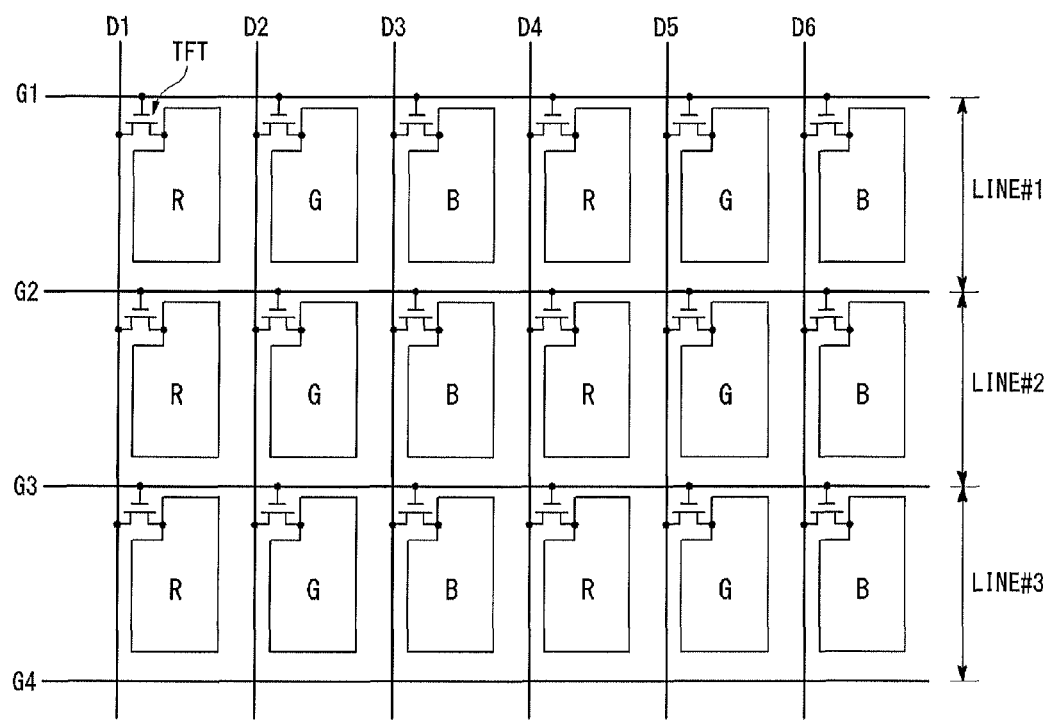
FIGS. 4 to 6 are equivalent circuit diagrams showing various examples of a TFT array.
Figure 5:
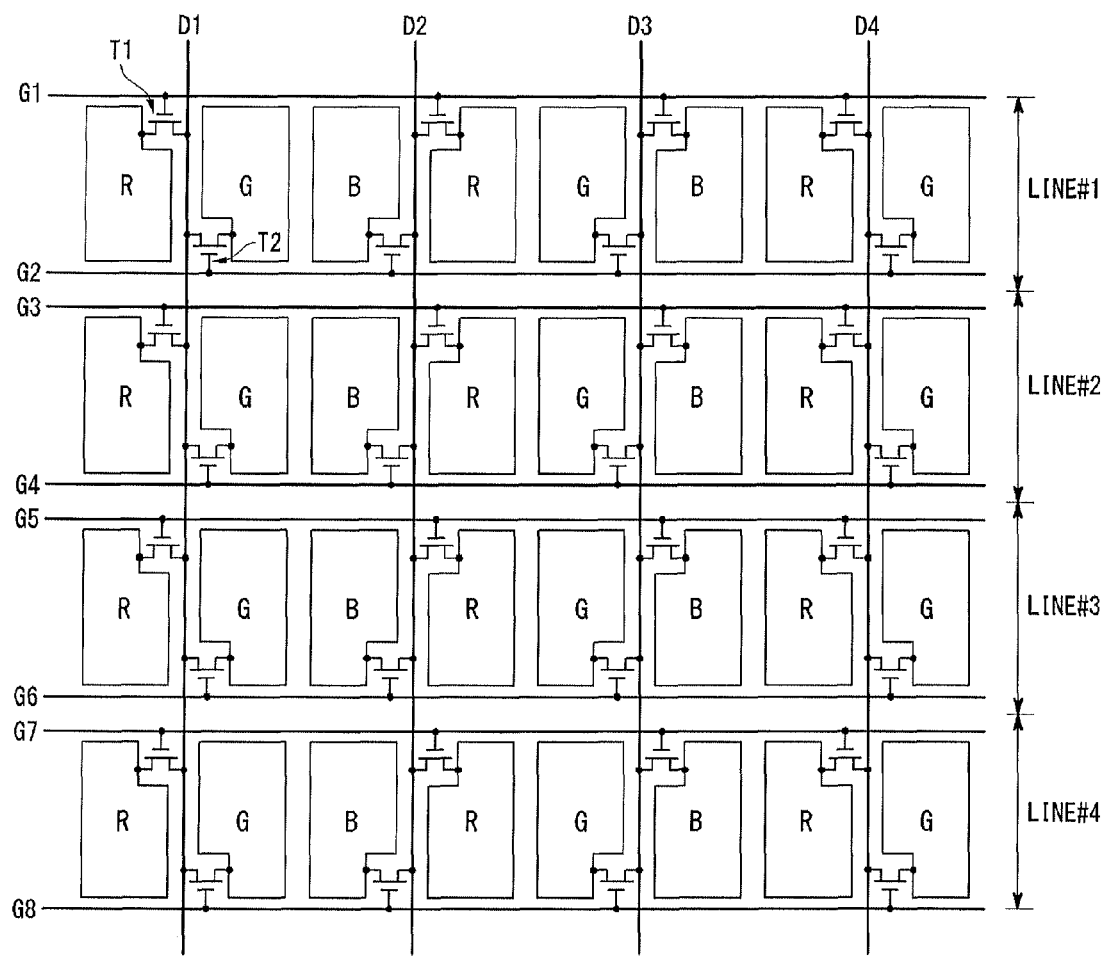
Figure 6:
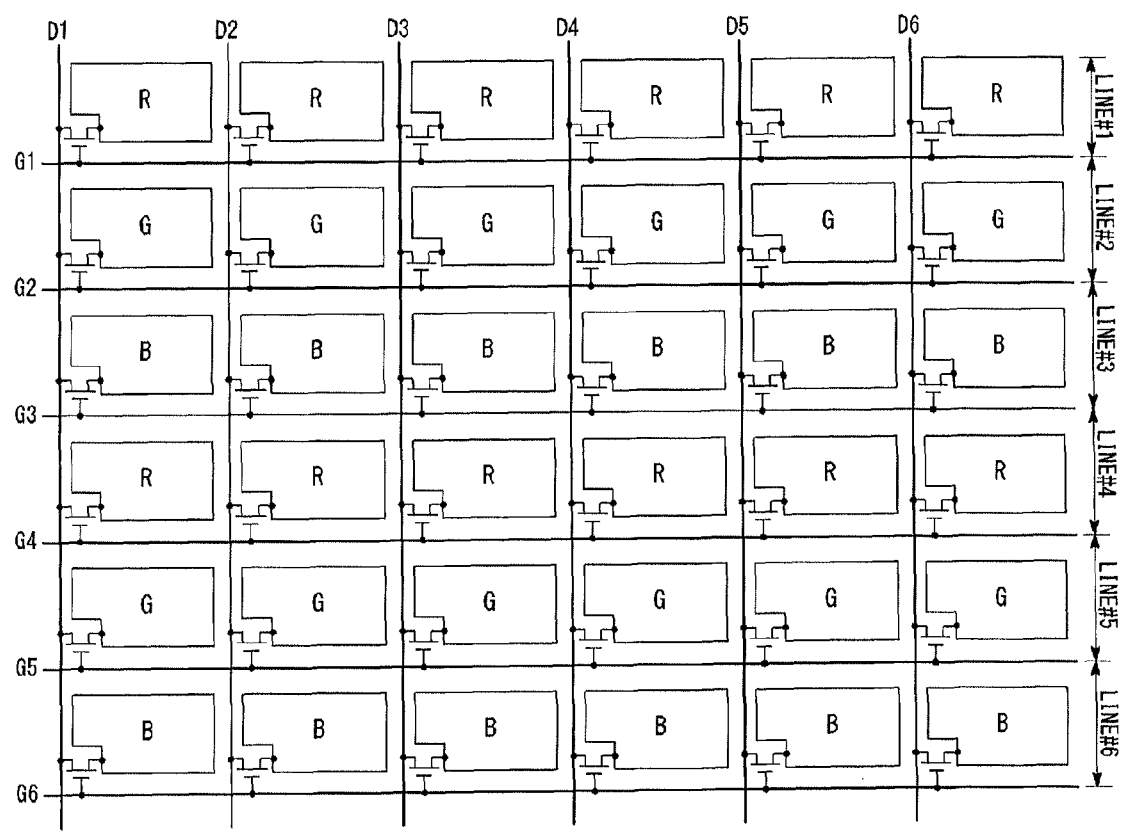

The TFT array may be implemented in a variety of forms, as shown in FIGS. 4 to 6, and may be of any well known structure. The liquid crystal cells Clc are connected to the TFTs and driven by an electric field between the pixel electrodes 1 and common electrodes 2. A color filter array comprising a black matrix, color filters, etc. are formed on the upper substrate of the liquid crystal display panel 100. Polarizers are respectively attached to the upper and lower substrates of the liquid crystal display panel 100. An alignment layer for setting a pre-tilt angle of liquid crystal is formed on the upper and lower substrates of the liquid crystal display panel 100.

The common electrodes 2 are formed on the upper substrate in a vertical electric field driving method such as a twisted nematic (TN) mode and a vertical alignment (VA) mode. On the other hand, the common electrodes 2 are formed on the lower substrate, together with the pixel electrodes 1, in a horizontal electric field driving method such as an in plane switching (IPS) mode and a fringe field switching (FFS) mode.

The liquid crystal display panel 100 applicable in the present invention may be implemented in any liquid crystal mode, as well as the TN mode, VA mode, IPS mode, and FFS mode. Moreover, the liquid crystal display f the present invention may be implemented in any form including a transmissive liquid crystal display, a semi-transmissive liquid crystal display, and a reflective liquid crystal display. The transmissive liquid crystal display and the semi-transmissive liquid crystal display require a backlight unit. The backlight unit may be a direct type backlight unit or an edge type backlight unit.

The timing controller (TCON) 101 supplies digital video data RGB of an input image input from a host system (SYSTEM) 104 to the data driver 102. The timing controller 101 receives timing signals, such as a vertical synchronization signal Vsync, a horizontal synchronization signal Hsync, a data enable signal DE, a dot clock signal CLK, etc from the host system 104.

The timing controller 101 generates timing control signals for controlling the operating timings of the data driver 102 and the gate driver 103 based on the timing signals received from the host system 104. The timing control signals comprise a gate timing control signal for controlling the operating timing of the gate driver 103, and a data timing control signal for controlling the operating timing of the data driver 102 and the polarity of a data voltage.

The data timing control signal comprises a source start pulse SSP, a source sampling clock SSC, a polarity control signal POL, a source output enable signal SOE, and the like. The source start pulse SSP controls the data sampling start timing of the data driver 102. The source sampling clock SSC is a clock signal for controlling a data sampling timing. The source output enable signal SOE controls the output timing of the data driver 102. When digital video data to be input to the data driver 102 is transmitted in the mini LVDS (Low Voltage Differential Signaling) interface standard, the source start pulse (SSP) and the source sampling clock (SSC) may be omitted.

The data driver 102 comprises a shift register, a latch, a digital-to-analog converter, and an output buffer. The data driver 102 latches digital video data RGB under the control of the timing controller 101. The data driver 102 converts the digital video data RGB into an analog positive/negative gamma compensation voltage to generate a data voltage and invert the polarity of the data voltage in response to a polarity control signal POL. The data driver 102 outputs the data voltage to the data lines DL in response to a source output enable signal SOE.

The gate driver 102 comprises a shift register and a level shifter. The gate driver 103 sequentially supplies a gate pulse synchronized with a data voltage to the gate lines GL in response to a gate timing control signal.

The host system 104 may be implemented as any one of the following: a television system, a home theater system, a set-top box, a navigation system, a DVD player, a Blu-ray player, a personal computer (PC), and a phone system. The host system 104 scales digital video data RGB of an input image according to the resolution of the liquid crystal display panel 100. The host system 104 transmits timing signals Vsync, Hsync, DE, and MCLK, together with the digital video data RGB of the input image, to the timing controller 101.

FIGS. 4 to 6 are equivalent circuit diagrams showing various examples of a TFT array. FIGS. 4 to 6 show part of the TFT array. In FIGS. 4 to 6, D1 to D6 indicate data lines, G1 to G6 indicate gate lines, and LINE#1 to LINE#6 indicate the numbers of lines of an active array A/A.

The TFT array of FIG. 4 is a TFT array which applies to most liquid crystal displays. The data lines D1 to D6 and the gate lines G1 to G4 cross each other on the TFT array. Red sub-pixels (R), green sub-pixels (G), and blue sub-pixels (B) are respectively arranged along a column direction on the TFT array. Each TFT supplies a data voltage from the data lines D1 to D6 to the pixel electrodes of liquid crystal cells arranged at the left side (or right side) of the data lines D1 to D6 in response to a gate pulse from the gate lines G1 to G4. Each pixel of the TFT array of FIG. 4 comprises a red sub-pixel (R), a green sub-pixel (G), and a blue sub-pixel (G) that neighbor each other in a row direction (or line direction) perpendicular to the column direction. If the resolution of the TFT array of FIG. 4 is (M×N) (M and N are a positive integer equal to or greater than 2), (M×3) data lines and N gate lines are required. In (M×3), 3 is the number of sub-pixels included in one pixel.

The number of data lines required by the TFT array of FIG. 5 is reduced to half the number of data lines required by the TFT array of FIG. 4 at the same resolution. The driving frequency of this TFT array is two times higher than that of the TFT array of FIG. 4. Due to this, a liquid crystal display panel having the TFT array of FIG. 5 may be referred to as a DRD (double rate driving) panel. Red sub-pixels (R), green sub-pixels (G), and blue sub-pixels (B) are respectively arranged along the column direction on the TFT array of this liquid crystal panel. Each pixel comprises a red sub-pixel (R), a green sub-pixel (G), and a blue sub-pixel (G) that neighbor each other in the line direction perpendicular to the column direction. Left and right neighboring liquid crystal cells share the same data line, and are continually charged with data voltages supplied in a time-division manner through the data line. A liquid crystal cell and a TFT which are arranged at the left side of the data lines D1 to D4 are referred to as a first liquid crystal cell and a first TFT T1, and a liquid crystal cell and a TFT which are arranged at the right side of the data lines D1 to D4 are referred to as a second liquid crystal cell and a second TFT T2, and the structure of this TFT array will be described below. The first TFT T1 supplies a data voltage from the data lines D1 to D4 to the pixel electrode of the first liquid crystal cell in response to a gate pulse from the odd numbered gate lines G1, G3, G5, and G7. A gate electrode of the first TFT T1 is connected to the odd numbered gate lines G1, G3, G5, and G7, and its drain electrode is connected to the data lines D1 to D4. The second TFT T2 supplies a data voltage from the data lines D1 to D4 to the pixel electrode of the second liquid crystal cell in response to a gate pulse from the even numbered gate lines G2, G4, G6, and G8. A gate electrode of the second TFT T2 is connected to the even numbered data lines G2, G4, G6, and G8, and its drain electrode is connected to the data lines D1 to D4. At the resolution (M×N), the TFT array of the liquid crystal display panel shown in FIG. 5 requires (M×3)/2 data lines and 2N gate lines.

The number of data lines required by the TFT array of FIG. 6 is reduced to ⅓ the number of data lines required by the TFT array of FIG. 4 at the same resolution. The driving frequency of this TFT array is three times higher than that of the TFT array of FIG. 4. Due to this, a liquid crystal display panel having the TFT array of FIG. 6 may be referred to as a DTRD (triple rate driving) panel. Red sub-pixels (R), green sub-pixels (G), and blue sub-pixels (B) are respectively arranged along the line direction on the TFT array of this liquid crystal display panel. Each pixel of the TFT array of FIG. 6 comprises a red sub-pixel (R), a green sub-pixel (G), and a blue sub-pixel (G) that neighbor each other in the column direction. The TFTs of the TFT array of FIG. 6 supply a data voltage from the data lines D1 to D6 to the pixel electrodes of liquid crystal cells arranged at the left side (or right side) of the data lines D1 to D6 in response to a gate pulse from the gate lines G1 to G6. At the resolution (M×N), the TFT array of the liquid crystal display panel shown in FIG. 6 requires M/3 data lines and 3N gate lines.

Even portable, small-sized mobile information terminals require high-resolution displays. Displays for mobile information terminals are mostly implemented as liquid crystal displays, and organic light emitting diode displays are used in some products. In the mobile information terminals, an organic passivation film PAC is used on the high-resolution displays in order to reduce the parasitic capacitance of display panels.

FIG. 7 is a top plan view showing a display structure of a mobile information terminal. FIG. 8 is a top plan view showing in detail the pad area of FIG. 7.

Referring to FIGS. 7 and 8, the mobile information terminal comprises an active area A/A for displaying an image and a pad area PAD.

A drive IC (D-IC) and an FPC are bonded to the pad area PAD. The data driver 102 and timing controller 101 of FIG. 3 are integrated within the drive IC (D-IC). Output terminal of the FPC are connected to input terminals of the drive IC (D-IC) through wires FLINK. The input terminals of the FPC are connected to output terminals of a phone system through a connector (not shown). The drive IC (D-IC) receives digital video data of an input image and timing signals from the phone system through the FPC, and supplies the signals to the active area A/A. The gate driver 103 may be formed directly on a substrate of the display panel, together with the TFT, in a GIP (Gate In Panel) process.

The pad area PAD may be divided into a first pad area 10, a second pad area 12, and a third pad area 14. First pads 11 may be formed in three stages on the first pad area 10. The output terminals of the drive IC (D-IC) are bonded to the first pads 11 by an ACF. The input terminals of the drive IC (D-IC) are bonded to second pads 13 formed in the second pad area 12 by an ACF. The output terminals of the FPC are bonded to third pads 15 formed in the third pad area 14 by an ACF. The second pads 12 connected to one end of the wires FLINK, and the third pads 15 are connected to the other end of the wires FLLINK. The wires FLINK connect the input terminals of the drive IC (D-IC) and the output terminals of the FPC on a one-to-one basis.

In the present invention, the organic passivation film PAC is completely removed from the first pad area 10, second pad area 12, and third pad area 14 indicated by dotted boxes in FIG. 8, in order to stably bond the drive IC and the FPC to the pad area PAD. Once the organic passivation film PAC is completely removed from the pad areas 10, 12, and 14, the level difference caused by the patterns of the thick organic passivation film PAC. As a result, the drive IC and the FPC can be bonded to the pads 11, 13, and 14 to form distinctive indentations in the drive IC and FPC bonding process.

The active area A/A is covered with the organic passivation film PAC. Some part of the pad area PAC, excluding the first pad area 10, second pad area 12, and third pad area 14, is covered with the organic passivation film PAC. The organic passivation film PAC is formed between the active area A/A and the first pad area 10. Also, the organic passivation film PAC is formed between the first pad area 10 and the second pad area 12, and the organic passivation film PAC is formed between the second pad area 12 and the third pad area 14.

FIGS. 9a through 9h are cross-sectional views showing in steps a method of fabricating the lower substrate of a liquid crystal display according to an exemplary embodiment of the present invention. As described above, the pad area PAD may be divided into first to third pad areas 10, 12, and 14 from which the organic passivation film PAC is removed. Of these pad areas, the second and third pad areas substantially have the same structure, and are illustrated in FIGS. 9a through 9h. The first pad area is omitted in FIGS. 9a through 9h, and illustrated in FIGS. 10 to 12. While the lower substrate structure shown in FIGS. 9a through 9h is applied to FFS mode (or AH-IPS mode), the present invention is not limited to FFS mode.

Figure 9A:
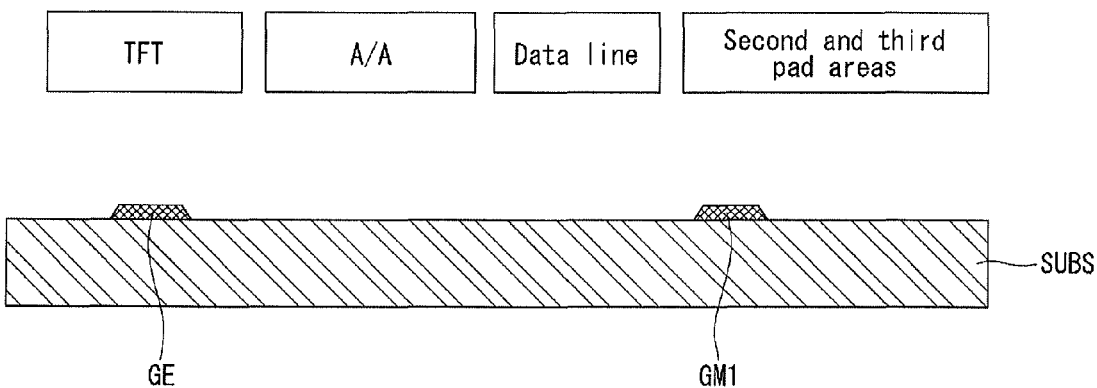
FIGS. 9a through 9h are cross-sectional views showing in steps a method of fabricating the lower substrate of a liquid crystal display according to an exemplary embodiment of the present invention.

In the present invention, as shown in FIG. 9a, first of all, a gate metal is deposited on a substrate SUBS in the active area A/A and the pad area PAD, and the gate metal is then patterned by a first photolithography process. In the photolithography process, photoresist is applied over the gate metal, a first photo mask is aligned over the photoresist, and then gate metal patterns are formed on the substrate SUB through exposure, development, and wet etching processes. The gate metal may be a metal selected from the group consisting of copper (Cu), aluminum (Al), aluminium neodymium (AlNd), and molybdenum (Mo), or a dual metal layer of Cu/MoTi. The gate metal patterns comprise gate lines GL, gate electrodes GE of TFTs connected to the gate lines GL, and gate metal patterns GM1 in the pad area PAD.

Figure 9B:
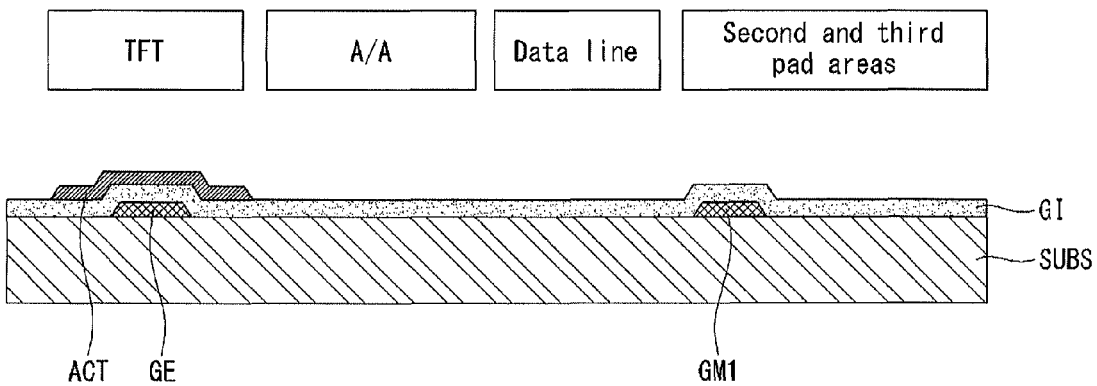

Next, as shown in FIG. 9b, a gate insulating film G1 is deposited on the substrate SUB so as to cover the gate metal patterns in the active area A/A and pad area PAD, a semiconductor layer is deposited on the gate insulating film G1, and the semiconductor layer is then patterned by a second photolithography process. The gate insulating film G1 may be made of an inorganic insulating material such as silicon nitride (SiNx). The semiconductor layer may be made of amorphous silicon (a-Si). In the second photolithography process, photoresist is applied over the semiconductor layer, a second photo mask is aligned over the photoresist, and then semiconductor patterns are formed on the gate insulating film G1 through exposure, development, and dry etching processes. The semiconductor patterns comprise an active layer ACT overlapping the gate electrodes GE of the TFTs.

Figure 9C:
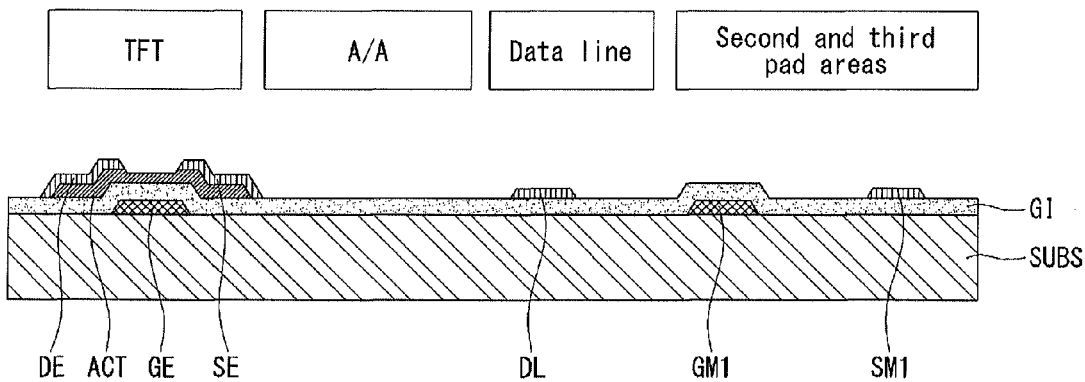

Next, as shown in FIG. 9c, a source-drain metal is deposited on the gate insulating film G1 so as to cover the semiconductor patterns in the active area AA and pad area PAD, and the source-drain metal is patterned by a third photolithography process. In the third photolithography process, photoresist is applied over the source-drain metal, a third photo mask is aligned over the photoresist, and then source-drain metal patterns are formed on the substrate SUBS through exposure, development, and wet etching processes. The source-drain metal may be a metal selected from the group consisting of copper, aluminum, aluminium neodymium, molybdenum, and chrome, or a dual or tripe layer stack of these metals. The source-drain metal patterns comprise data lines DL, data electrodes DE of the TFTs connected to the data lines DL, source electrodes SE of the TFTs, data links DLINK connected to the data lines DL, and source-drain metal patterns SM1 in the pad area PAD.

Figure 9D:
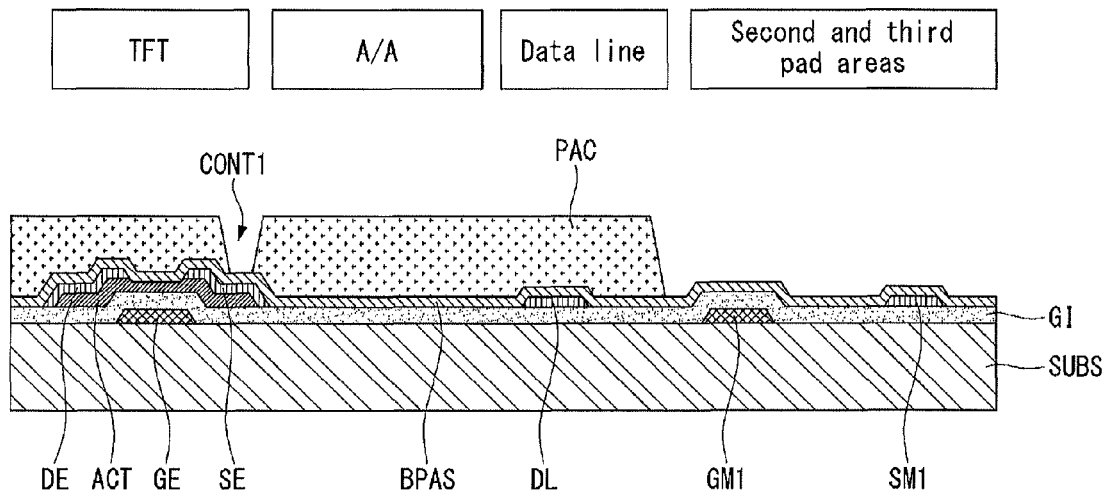
Figure 9E:
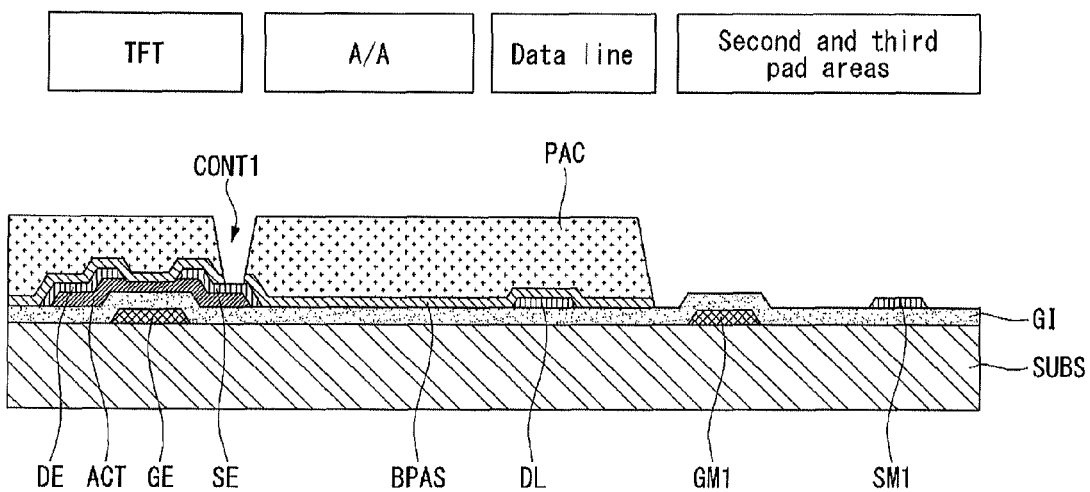

Next, as shown in FIG. 9d, a buffer passivation film BPAS is deposited on the entire surface of the gate insulating film G1 so as to cover the source-drain patterns in the active area AA and the pad area PAD, a thick organic passivation film PAC is applied over the buffer passivation film BPAS, and then the organic passivation film PAC is patterned by a fourth photolithography process. The buffer passivation film BPAS may be made of an inorganic insulating film such as silicon nitride (SiNx). The organic passivation film PAC may be made of photo-acryl. The gate insulating film G1 has a thickness of approximately 3,000 Å to 4,000 Å, and the buffer passivation film BPAS has a thickness of approximately 1,000 Å. In contrast, the organic passivation film PAC has a large thickness of approximately 20,000 Å (=2 μm). In the fourth photolithography process, a fourth photo mask is aligned over the photo-acryl, and then exposure, development, and dry etching processes are carried out. As shown in FIG. 9e, the wet etching process is performed in order to remove the buffer passivation film BPAS, which is formed in advance of the photo-acryl. As the dry etching process is carried out at different etching levels on the entire surface of the substrate SUBS, the substrate is over-etched enough to fully remove the buffer passivation film BPAS from the entire surface. The fourth photo mask exposes the organic passivation film PAC in the first pad area 10, second pad area 12, and third pad area 14 of the pad area PAD, and covers the organic passivation film PAC in the remaining pad area PAD and the active area A/A. As a result, the buffer passivation film BPAS is removed from the first pad area 10, second pad area 12, and third pad area 14 of the pad area PAD by the fourth photolithography process and the etching process, and the organic passivation film PAC and the buffer passivation film BPAS remain in the remaining pad area PAD and the active area A/A. As shown in FIG. 9e, the source electrodes SE of the TFTs are exposed via contact holes CONT1 penetrating the organic passivation film PAC and the buffer passivation film BPAS, and the source-drain metal patterns SM1 in the second and third pad areas are exposed.

Figure 9F:
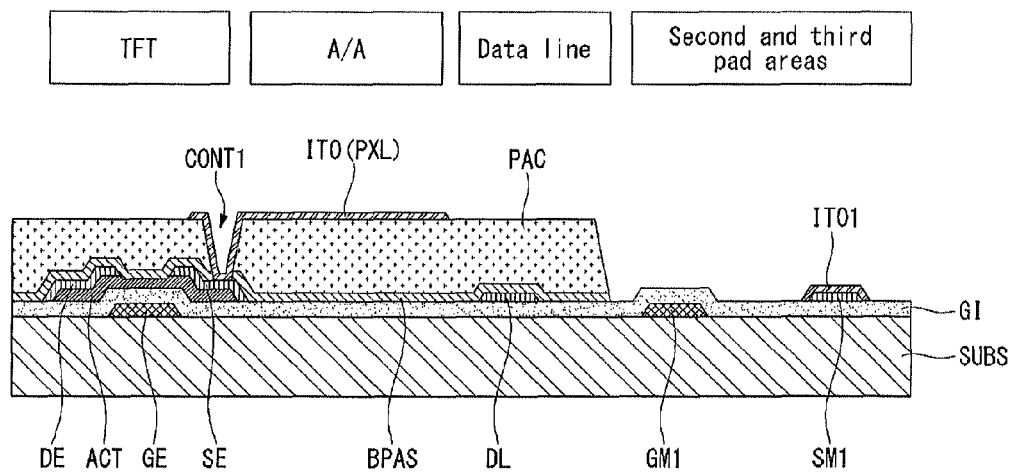

Next, as shown in FIG. 9f, a transparent electrode material such as ITO is deposited in the active area A/A and the pad area PAD, and the transparent electrode material is patterned by a fifth photolithography process. In the fifth photolithography process, a fifth photo mask is aligned over the transparent electrode material, and then exposure, development, and wet etching processes are carried out to form first transparent electrode patterns on the organic passivation film PAC. The first transparent electrode patterns comprise pixel electrodes ITO (PXL) being in contact with the source electrodes SE of the TFTs and transparent electrode patterns ITO1 covering the source-drain metal patterns SM1 in the second and third pad areas 12 and 14.

Figure 9G:
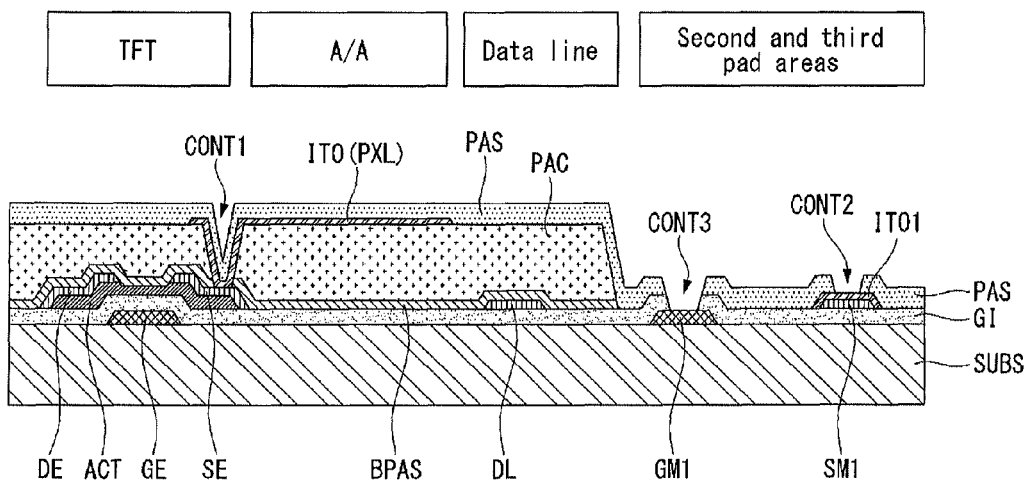

Next, as shown in FIG. 9g, an upper passivation film PAS is deposited to cover the first transparent electrode patterns in the active area A/A and the pad area PAD, and then the upper passivation film PAS is patterned by a sixth photolithography process. The upper passivation film PAS may be made of an inorganic insulating material such as silicon nitride (SiNx), and has a thickness of approximately 3,000 Å. In the sixth photolithography process, a sixth photo mask is aligned over the upper passivation film PAS, and then exposure, development, and dry etching processes are carried out. As a result, second contact holes CONT2 penetrating the upper passivation film PAS are formed to expose the transparent electrode patterns ITO1 in the second and third pad areas 12 and 14, and third contact holes CONT3 penetrating the upper passivation film PAS and the gate insulating film G1 are formed to expose the gate metal patterns GM1 in the second and third pad areas 12 and 14.

Figure 9H:
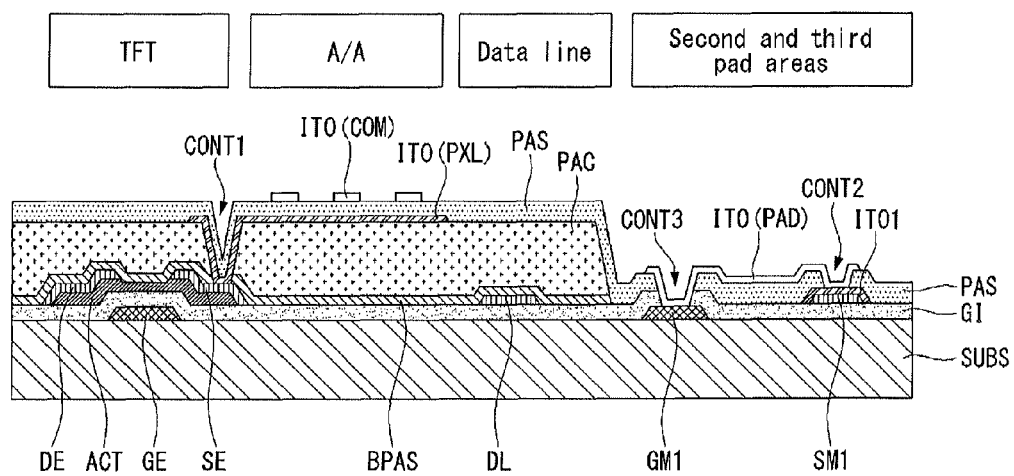

Next, as shown in FIG. 9h, a transparent electrode material such as ITO is deposited in the active area A/A and the pad area PAD, and then the transparent electrode material is patterned by a seventh photolithography process. In the seventh photolithography process, a seventh photo mask is aligned over the transparent electrode material, and then exposure, development, and dry etching processes are carried out to form second transparent electrode patterns on the upper passivation film PAS. The second transparent electrode patterns comprise common electrodes ITO (COM) and transparent electrode patterns ITO (PAD) in the second and third pad areas 12 and 14. The common electrodes ITO (COM) overlap the pixel electrodes ITO (PXL), with the upper passivation film PAS interposed between them. The transparent electrode patterns ITO (PAD) are brought into contact with the transparent electrode patterns ITO1 via the second contact holes CONT2 and with the gate metal patterns GM1 via the third contact holes CONT3.

When the TFTs are turned on in response to a gate pulse, a data voltage is supplied to the pixel electrodes ITO (PXL) through the data lines DL and the TFTs. A common voltage Vcom is supplied to the common electrodes ITO (COM). Liquid crystals of the liquid crystal cells are driven by an electric field formed by a potential difference between the pixel electrodes ITO (PXL) and the common electrodes ITO (COM).

Figure 10:
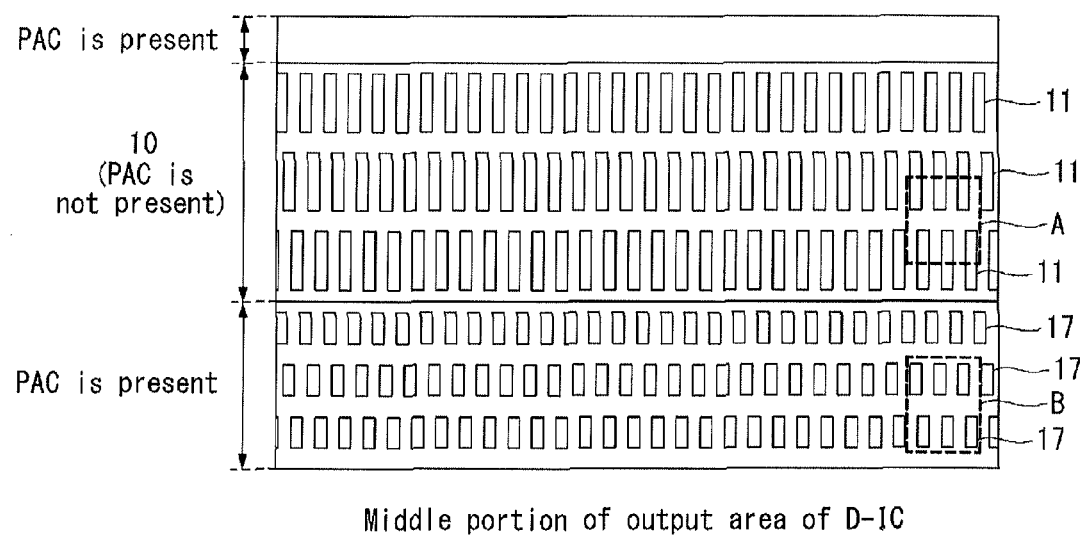
FIG. 10 is a top plan view showing in detail the first pad area of FIG. 8 and part of its surroundings.
Figure 11:
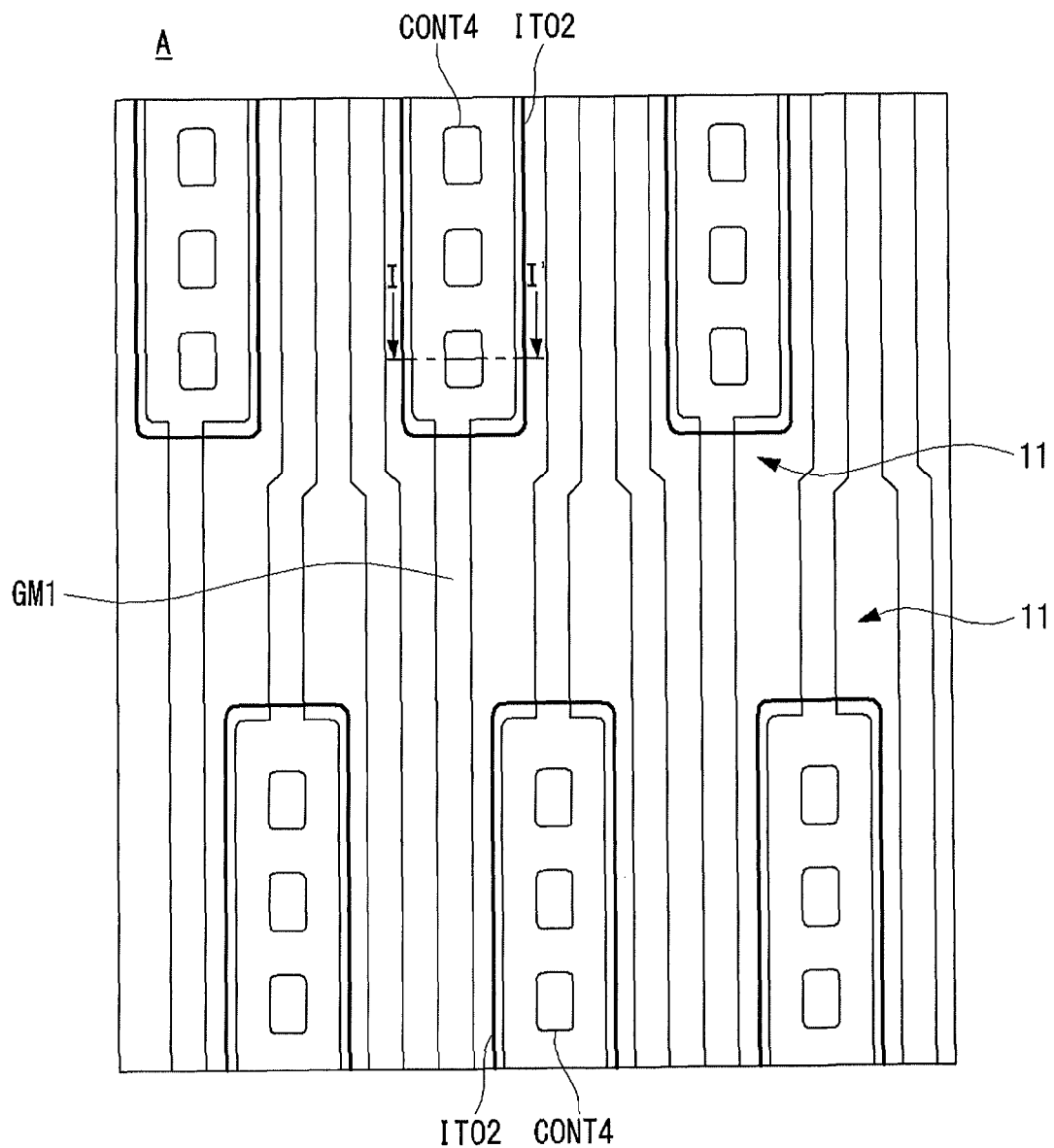
FIG. 11 is an enlarged top plan view showing portion A of FIG. 10.
Figure 12:
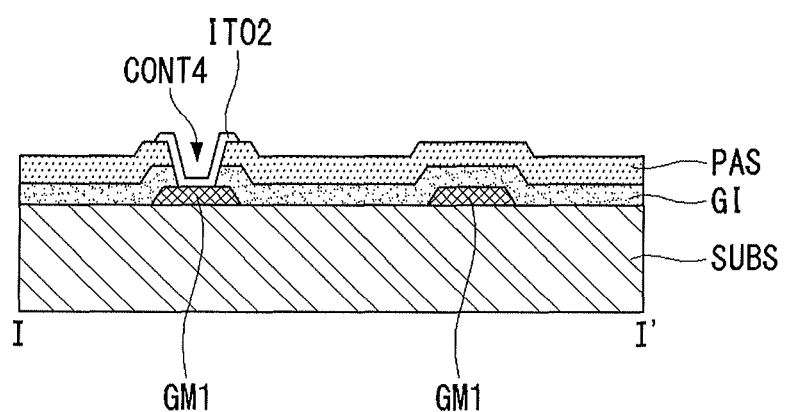
FIG. 12 is a cross-sectional view taken along line I-I' of FIG. 11.

FIG. 10 is a top plan view showing in detail the first pad area 10 of FIG. 8 and part of its surroundings. FIG. 11 is an enlarged top plan view showing portion A of FIG. 10. FIG. 12 is a cross-sectional view taken along line I-I' of FIG. 11.

Referring to FIGS. 10 to 12, the organic passivation film PAC is removed from the first pad area 10. In a drive IC bonding process for bonding the output terminals of the drive IC (D-IC) to the first pads 11 of the first pad area 10, the drive IC (D-IC) can be bonded to the first pads 11 without causing the problem of having no indentations and the problem of needing a drive IC repair process because the level difference in the first pad area 10 is small.

In the cross-sectional structure of the first pad area 10, the first pads 11 of the first pad area 10 and the wires connected to the first pads 11 are all formed of gate metal patterns GM1. The gate insulating film G1 is formed on the substrate SUBS so as to cover the gate metal patterns GM1. The upper passivation film PAS is formed directly on the gate insulating film G1. Transparent electrode patterns ITO2 are formed on the upper passivation film PAS, and brought into contact with part of the gate metal patterns GM1 via contact holes CONT4 penetrating the upper passivation film PAS and the gate insulating film G1. The transparent electrode patterns ITO2 are formed simultaneously with the second transparent electrode patterns, which are formed by the seventh photolithography process (FIG. 9h).

Meanwhile, if the first pads 11 formed in the first pad area 10 and the wires connected to the first pads 11 are made of a source-drain metal, the source-drain metal may be damaged during the process of removing the organic passivation film PAC from the first pad area 10, thus causing a wiring disconnection problem. More specifically, in order to remove the organic passivation film PAC and the underlying buffer passivation film BPAS to expose the source electrodes SE of the TFTs, the buffer passivation film BPAS is removed when a dry etching process is performed on the organic passivation film PAC. As the uniformity of dry etching differs depending on the position of the substrate on the display panel, the buffer passivation film BPAS is over-etched in consideration of shallow etched portions. In this case, even the source-drain metal is etched in deeply etched portions. The source-drain metal exposed via the contact holes may be eliminated by an etchant. Accordingly, it is preferred that the metal patterns in the first pad area 10 are all made of a gate metal which is covered with the gate insulating film G1, so as to prevent the wires connecting the pads 11 of the first pad area 10 from being disconnected by an etchant during the dry etching process of the organic passivation film and the subsequent wet etching process of the transparent electrode material.

For an auto probe (A/P) test, A/P test pads (not shown), with which an auto probe is in contact, are formed on the display panel. The A/P test pads are formed of source-drain metal patterns. Accordingly, metal jumping parts are required which connect the source-drain metal patterns connected to the A/P test pads and the gate metal patterns GM1 of the first pad area 10. To this end, metal jumping parts 17, which are covered with the organic passivation film) AC, are formed between the first pad area 10 and the second pad area 12, as shown in portion B of FIG. 10.

Figure 13:
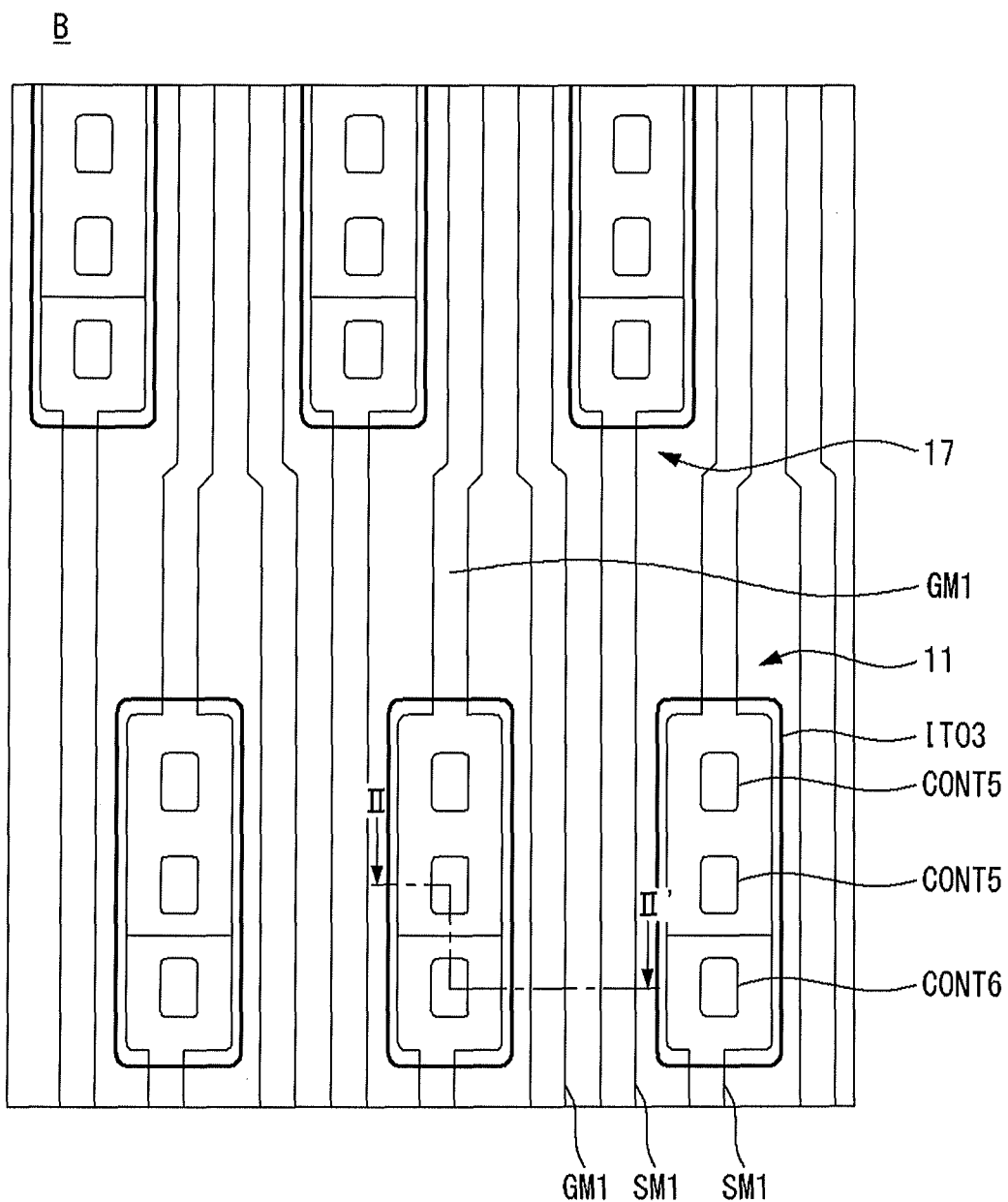
FIG. 13 is an enlarged top plan view showing portion B of FIG. 10.
Figure 14:
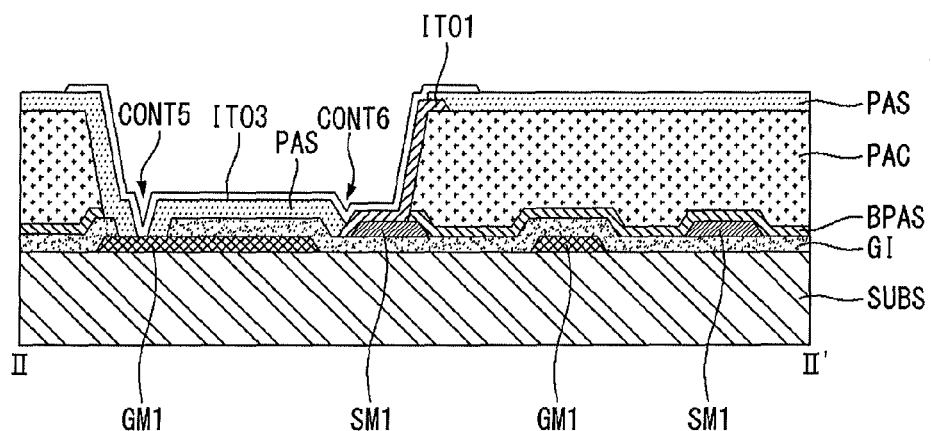
FIG. 14 is a cross-sectional view taken along line II-II' of FIG. 13.

As shown in FIGS. 13 and 14, each metal jumping part 17 comprises a gate metal pattern GM1, a source-drain metal pattern SM1 formed on the gate insulating film G1, a transparent electrode pattern ITO1, and a transparent electrode pattern ITO3 connecting the gate metal pattern GM1 and the transparent electrode pattern ITO1.

The transparent electrode patterns ITO3 are brought into contact with part of the gate metal patterns GM1 via contact holes CONT5 penetrating the upper passivation film PAS and the gate insulating film G1, and brought into contact with part of the source-drain metal patterns SM1 via contact holes CONT6 penetrating the organic passivation film PAC and the upper passivation film PAS. The transparent electrode patterns ITO1 are formed simultaneously with the first transparent electrode patterns in the fifth photolithography process (FIG. 9f). The transparent electrode patterns ITO3 are formed simultaneously with the second transparent electrode patterns in the seventh photolithography process (FIG. 9h). As the source-drain metal patterns SM1 are covered with the transparent electrode patterns ITO1, which are formed simultaneously with the first transparent electrode patterns ITO (PXL) by the fifth photolithography process, as shown in FIGS. 9f and 14, they do not address the problem of damage to the source-drain metal patterns SM1, which is caused by the wet etching process of the transparent electrode material. The size of the metal jumping parts 17 may be half the size of the first pads 11 of the first pad area 10 from which the organic passivation film PAC is removed. The drive IC (D-IC) or FPC is not bonded in the area between the first pad area 10 and the second pad area 12. Accordingly, the area where the metal jumping parts 17 are formed are not associated with indentations or the repair process of the drive IC (D-IC) and the FPC.

Figure 15:
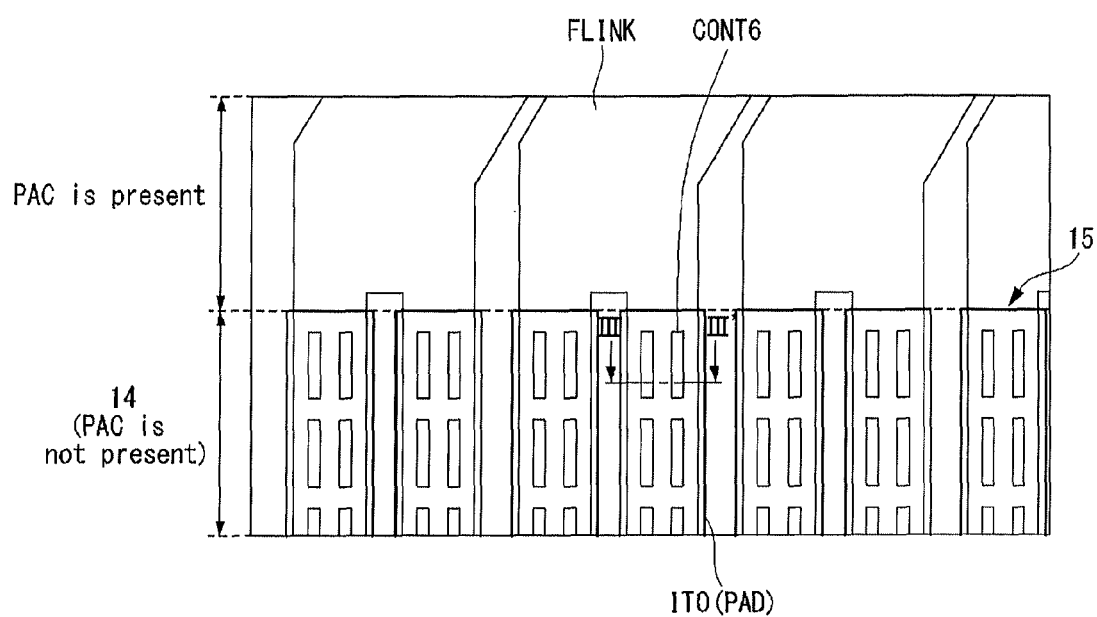
FIG. 15 is a top plan view showing in detail the third pad area 14 to which the FPC is bonded and part of its surroundings.
Figure 16:
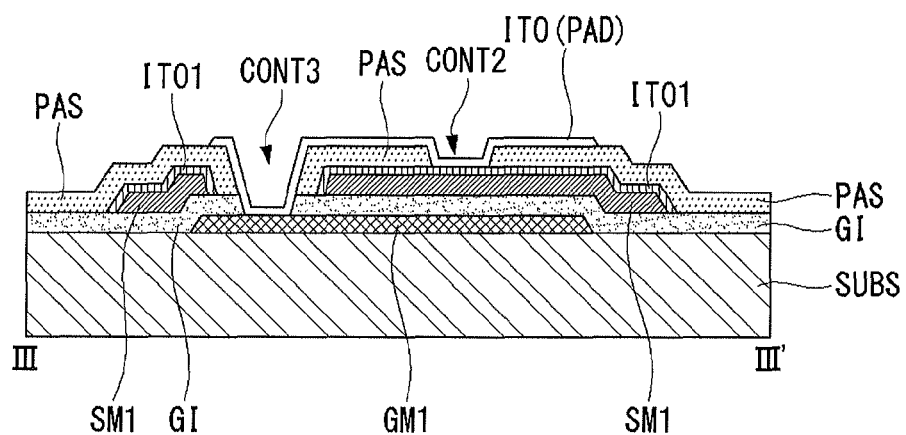
FIG. 16 is a cross-sectional view taken along line III-III' of FIG. 15.

FIG. 15 is a top plan view showing in detail the third pad area 14 to which the FPC is bonded and part of its surroundings. FIG. 16 is a cross-sectional view taken along line III-III' of FIG. 15.

Referring to FIGS. 15 and 16, the third pads 15 are connected to the wires FLINK, and bonded to the output terminals of the FPC by an ACF.

In the third pads 15, the gate metal patterns GM1 and the source-drain metal patterns SM1 are interconnected through the transparent electrode patterns ITO1 and ITO (PAD) in a parallel structure. The transparent electrode patterns ITO1 are formed simultaneously with the first transparent electrode patterns by the fifth photolithography process (FIG. 9f) to cover the source-drain metal patterns SM1. The transparent electrode patterns ITO (PAD) are formed simultaneously with the second transparent electrode patterns by the seventh photolithography process (FIG. 9h). The transparent electrode patterns ITO (PAD) are brought into contact with part of the gate metal patterns GM1 via the contact holes CONT3 penetrating the upper passivation film PAS and the gate insulating film G1, and brought into contact with part of the transparent electrode patterns ITO1 via the contact holes CONT2 penetrating the upper passivation film PAS.

The third pad area 14 may be stably bonded to the output terminals of the FPC in the FPC bonding process because it the organic passivation film PAC is not present in the third pad area 14. Accordingly, the problem of having no indentations and the problem of FPC repair do not occur in the third pad area 14.

The second pad area 12 substantially has the same cross-sectional structure as the third pad area 14. Accordingly, the input terminals of the drive IC can be bonded to the second pads 13 in the second pad area 12 without causing the problem of having no indentations and the problem of FPC repair.

The source-drain metal patterns SM1 are covered with the transparent electrode patterns ITO1 in the second and third pad areas 12 and 14. By doing so, it is possible to prevent the source-drain metal patterns SM1 from being damaged or eliminated by the etchant when the first transparent electrode patterns are wet-etched in the fifth photolithography process (FIG. 9f).

A short-circuit (or short) between wires may occur at the boundaries between the portion where the organic passivation film PAC is present and the portion where the organic passivation film PAC is not present. To prevent such a short-circuit problem, the present invention applies a short-circuit prevention structure shown in FIGS. 20 to 22 and FIGS. 26 to 28 to the boundaries between the portion where the organic passivation film PAC is present and the portion where the organic passivation film PAC is not present, in the pad area PAD. Prior to describing the short-circuit prevention structure, an example of the above-mentioned short-circuit problem will be described in conjunction with FIGS. 17 and 18.

Figure 17:
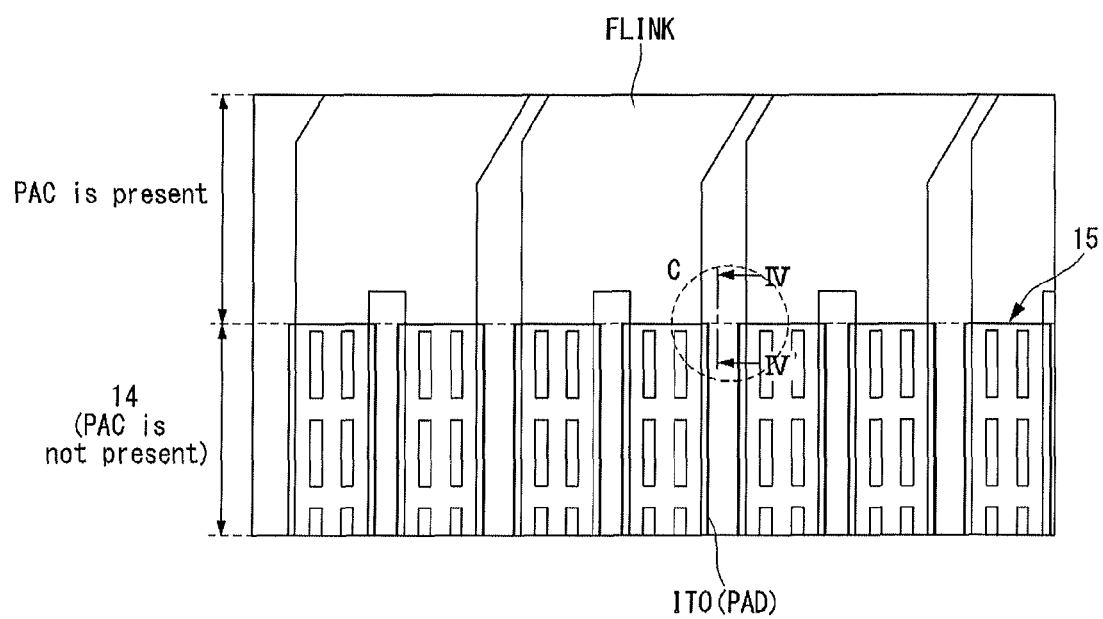
FIG. 17 is a top plan view showing an example of a short-circuit between neighboring wires on the boundaries between the portion where the organic passivation film is present and the portion where the organic passivation film is not present.
Figure 18:
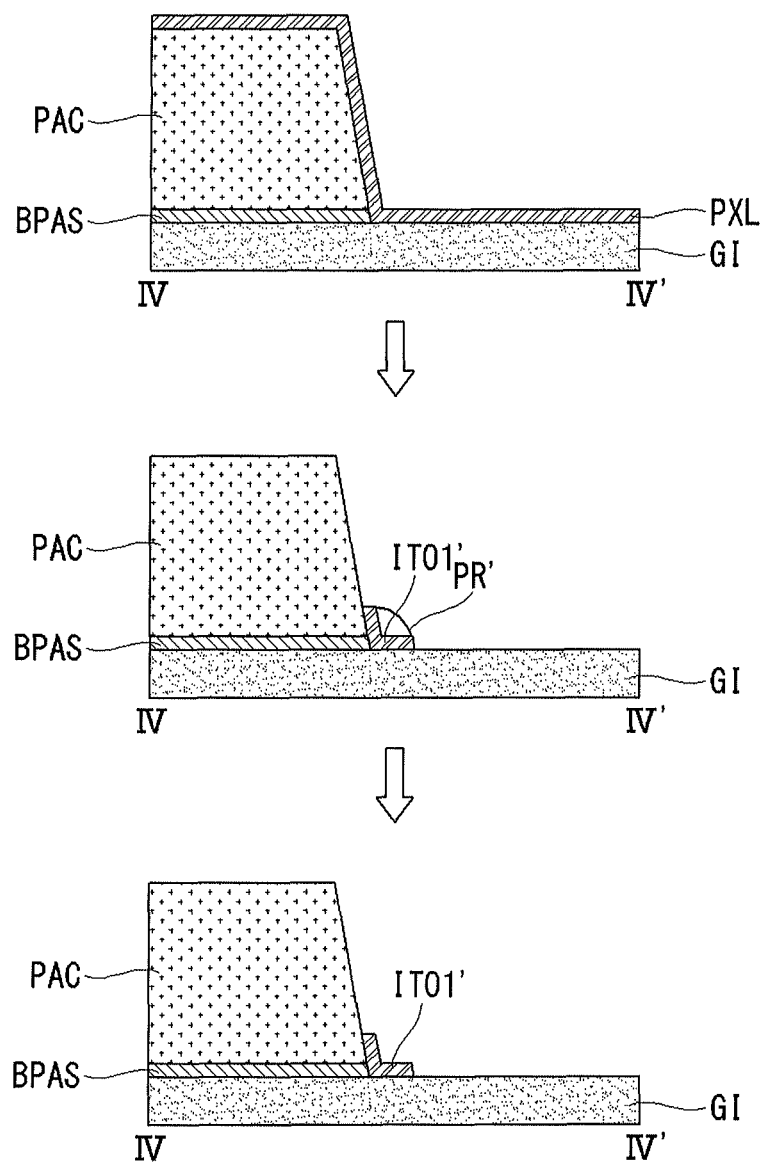
FIG. 18 is a cross-sectional view taken along line IV-IVI of FIG. 17.

In the fifth photolithography process (FIG. 9f), when exposure and development processes are carried out after depositing a transparent electrode material and applying photoresist on the substrate, an undesired residual film PR' of the photoresist may be left, as shown in FIGS. 17 and 18, along the boundary lines between the portion where the organic passivation film PAC is present and the portion where the organic passivation film PAC is not present. The level difference on the PAC boundary lines becomes larger because the organic passivation film PAC has a large thickness. The photoresist is not exposed sufficiently to light on the PAC boundary lines with the large level difference. Due to this, the residual film PR' of the photoresist remains on the PAC boundary lines after the photoresist development process.

Figure 19:
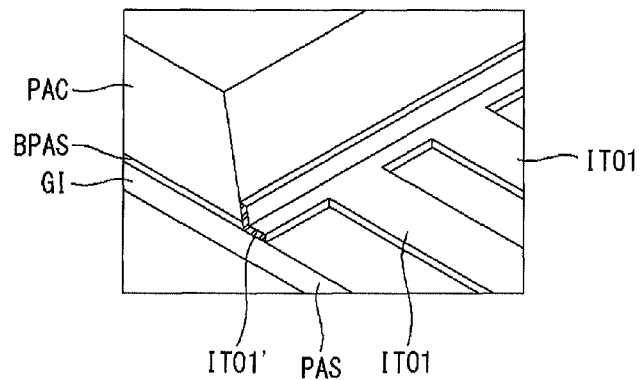
FIG. 19 is a perspective view showing an example of the wires short-circuited by the conductive impurities of FIG. 17.

If the transparent electrode material is etched while the residual film PR' of the photoresist remains on the PAC boundary lines, the transparent electrode material covered by the residual film PR' of the photoresist is not etched but remains along the boundary lines. The residues of the transparent electrode material remaining along the PAC boundary lines act as conductive impurities ITO' that short-circuit the wires in the pad area. The conductive impurities ITO1' cross the plurality of wires FLINK along the PAC boundary lines as shown in FIG. 19, and forms the short-circuit with the transparent electrode patterns ITO1 on the wires FLINK. Increasing the amount of UV exposure on the photoresist can increase the amount of exposure of the photoresist applied to the PAC boundary lines, but may cause an excessive exposure of the photoresist in other portions, and this may reduce or eliminate the line width of the wires formed of the first transparent electrode patterns ITO1.

The present invention applies the short-circuit prevention structure shown in FIGS. 20 to 22 and FIGS. 26 to 28 to the PAC boundary lines in the pad area PAD. This short-circuit prevention structure is applicable to any PAC boundary line in the pad area PAD. While FIGS. 20 to 22 and FIGS. 26 to 28 show the short-circuit prevention structure applied to the PAC boundary lines on the upper edge of the third pad area, they may be applicable to other PAC boundary lines.

Figure 20:
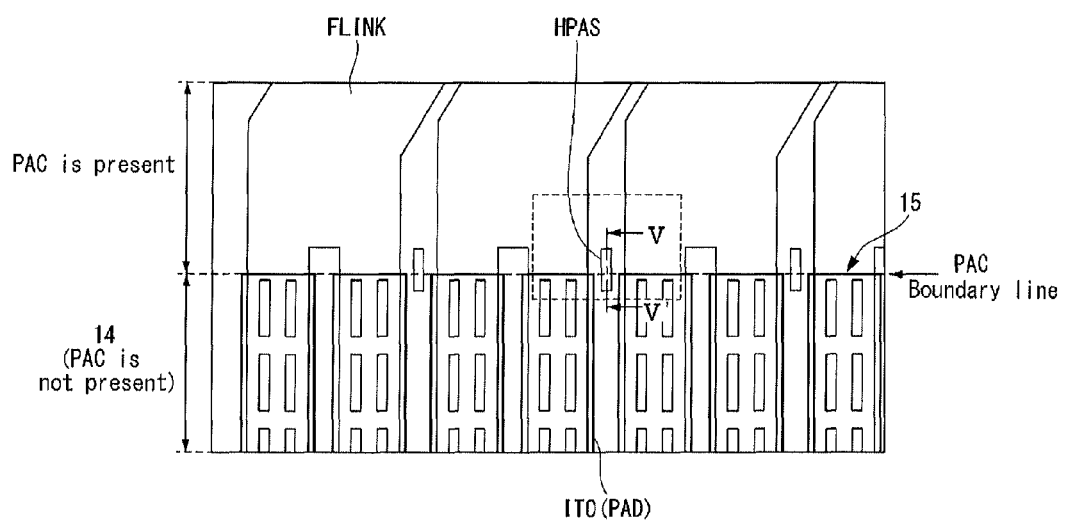
FIG. 20 is a top plan view showing an example of a short-circuit prevention structure using holes formed in the upper passivation film.
Figure 21:
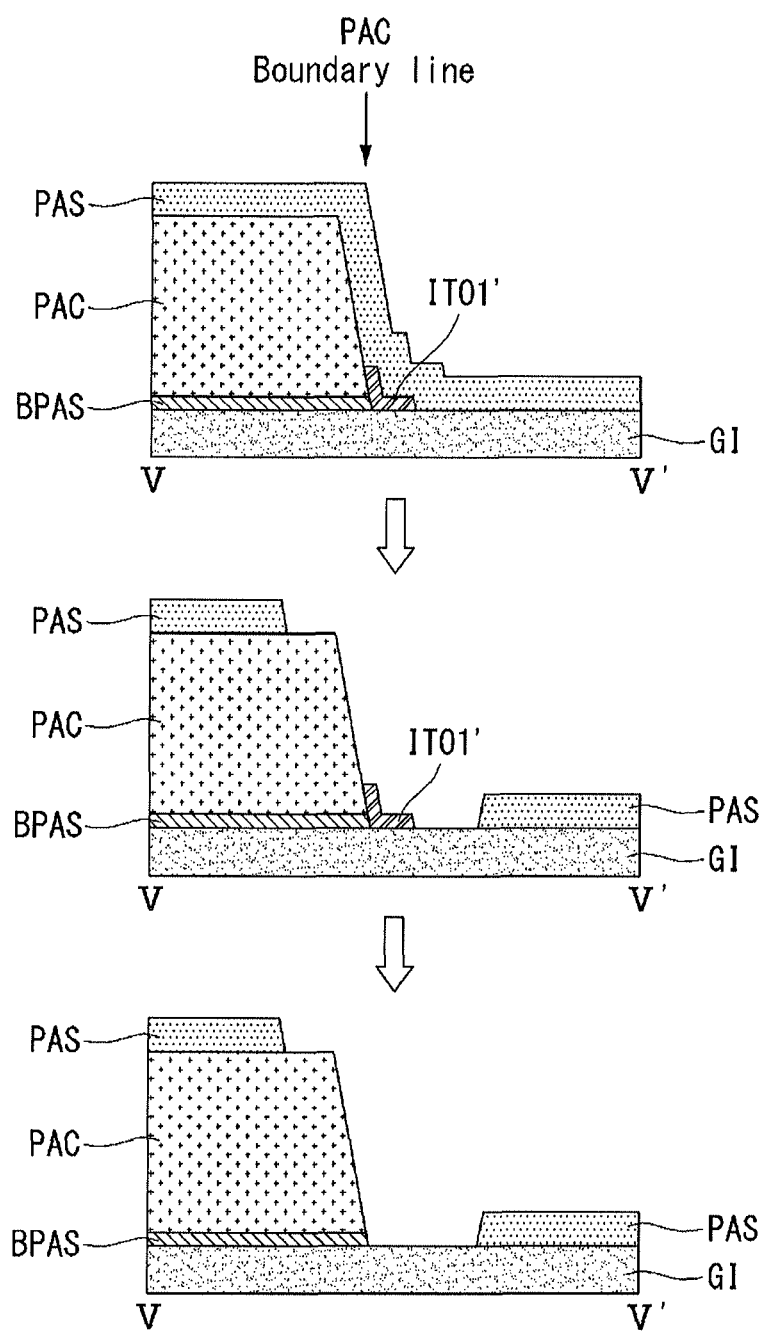
FIG. 21 is a cross-sectional view taken along line V-V' of FIG. 20.
Figure 22:
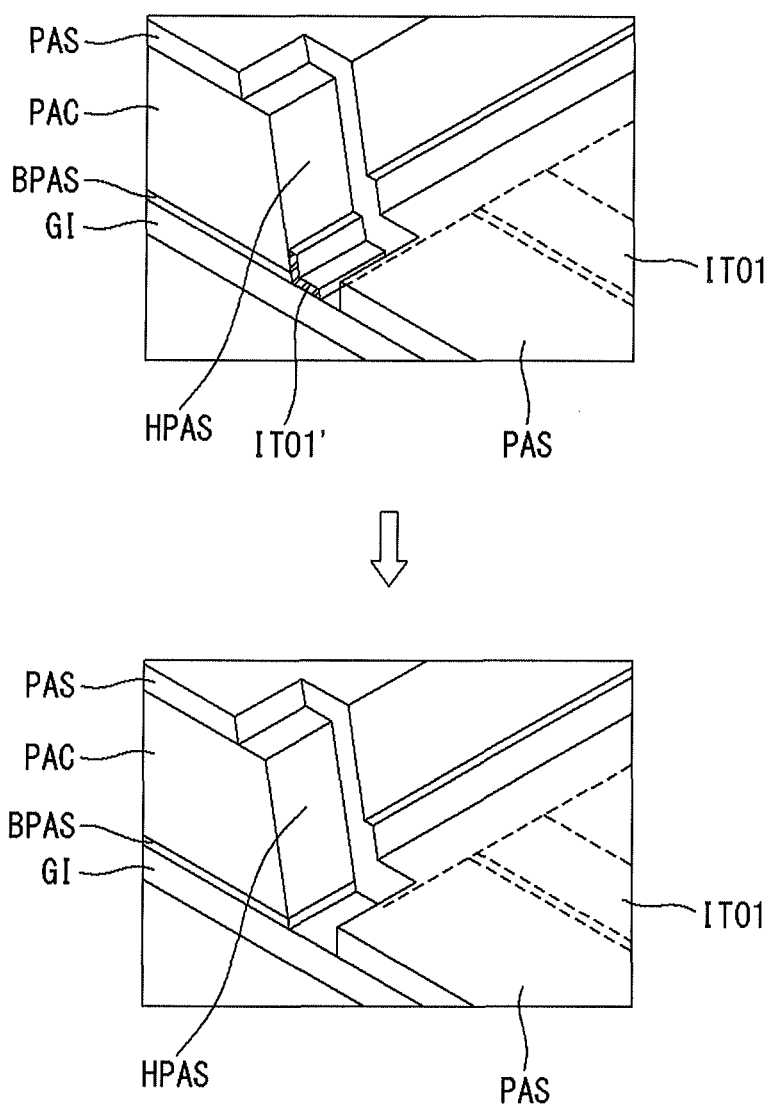
FIG. 22 is a perspective view showing the holes formed in the upper passivation film.

FIG. 20 is a top plan view showing an example of a short-circuit prevention structure using holes (hereinafter, "PAS holes HPAS") formed in the upper passivation film PAS. FIG. 21 is a cross-sectional view taken along line V-V' of FIG. 20. FIG. 22 is a perspective view showing the PAS holes HPAS.

Referring to FIGS. 20 to 22, a plurality of PAS holes HPAS are formed along boundary lines with a large level difference. The PAS holes HPAS are arranged between signal lines, i.e., wires FLINK, running across the PAC boundary lines and expose layers under the upper passivation film PAS.=

In the fifth photolithography process (FIG. 9f), when exposure and development processes are carried out after depositing a transparent electrode material and applying photoresist on the substrate, a residual film PR' of the photoresist is left along the PAC boundary lines, and as a result, conductive impurities ITO1' remain along the PAC boundary lines.

PAS holes HPAS are formed along the boundary lines on the upper passivation film PAS when the upper passivation film PAS is patterned in the sixth photolithography process (FIG. 9g). The PAS holes HPAS are formed by dry-etching the upper passivation film PAS not covered by a photoresist pattern in the sixth photolithography process, and expose the conductive impurities ITO1' remaining along the PAC boundary lines, as shown in FIGS. 21 and 22. Next, in the seventh photolithography process (FIG. 9h), the second transparent electrode patterns are patterned. In the seventh photolithography process, the etchant for wet-etching the transparent electrode patterns etches the transparent electrode material formed on the upper passivation film PAS, and also exposes the conductive impurities ITO1', which penetrate into the PAS holes HPAS and cause a short-circuit.

Figure 23:
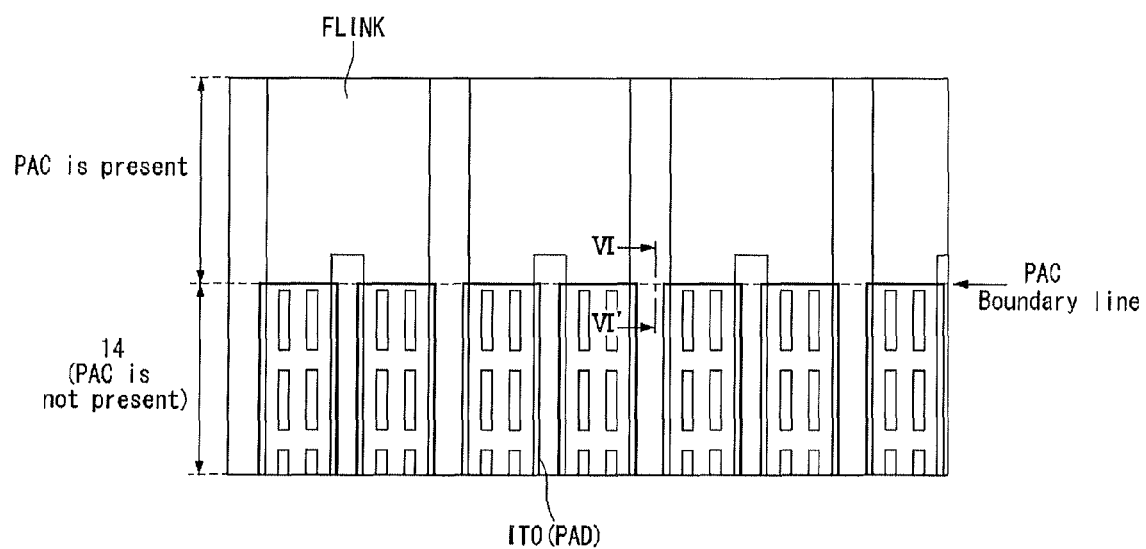
FIG. 23 is a top plan view showing another example of a short-circuit between neighboring wires on the boundaries between the portion where the organic passivation film is present and the portion where the organic passivation film is not present.
Figure 24:
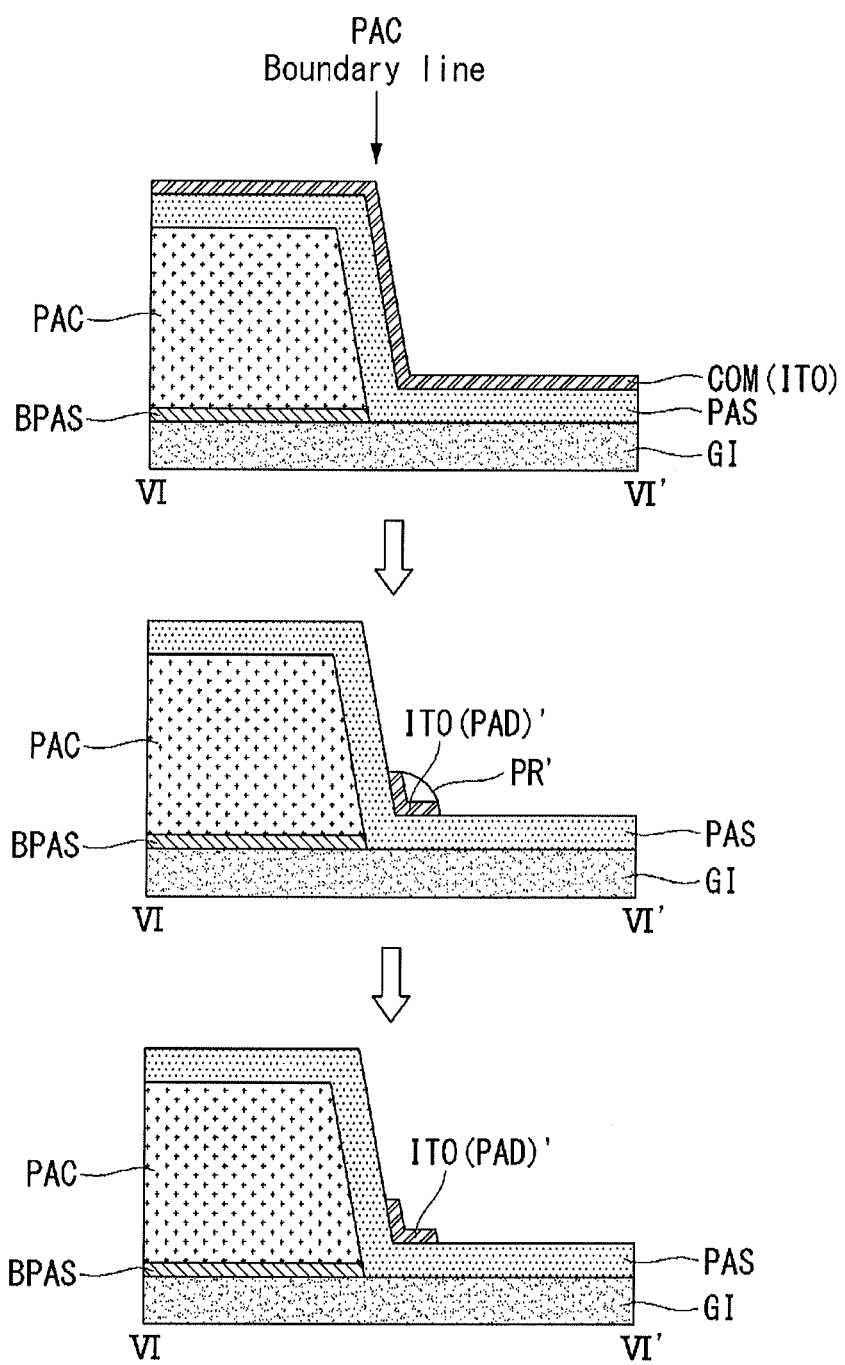
FIG. 24 is a cross-sectional view taken along line VI-VI of FIG. 23.
Figure 25:
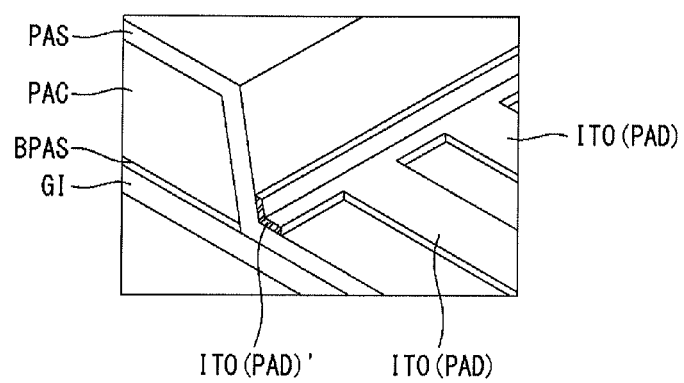
FIG. 25 is a perspective view showing an example of the wires short-circuited by the conductive impurities of FIG. 24.

As shown in FIGS. 23 to 25, the second transparent electrode patterns formed by the seventh photolithography process (FIG. 9h) also may cause a short-circuit problem on the PAC boundary lines with the large level difference.

FIG. 23 is a top plan view showing another example of a short-circuit between neighboring wires FLINK on the PAC boundary lines. FIG. 24 is a cross-sectional view taken along line VI-VI of FIG. 23. FIG. 25 is a perspective view showing an example of the wires FLINK short-circuited by the conductive impurities ITO (PAD)' of FIG. 24.

Referring to FIGS. 23 to 25, in the seventh photolithography process (FIG. 9h), when exposure and development processes are carried out after depositing a transparent electrode material and applying photoresist on the substrate, an undesired residual film PR' of the photoresist may be left along the PAC boundary lines. Due to the residual film PR' of the photoresist, the transparent electrode material is not etched but remains along the PAC boundary lines. The conductive impurities ITO (PAD)' cross the plurality of wires FLINK along the PAC boundary lines as shown in FIG. 25, and short-circuit the transparent electrode patterns ITO (PAD) on the wires FLINK. Increasing the amount of UV exposure on the photoresist can increase the amount of exposure of the photoresist applied to the PAC boundary lines, but may cause an excessive exposure of the photoresist in other portions, and this may reduce or eliminate the line width of the wires formed of the transparent electrode patterns ITO (PAD).

Figure 26:
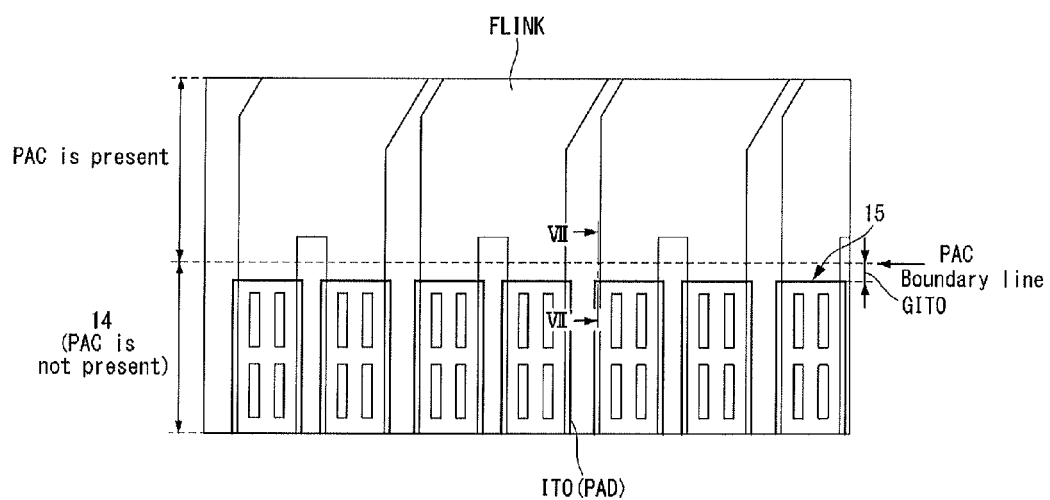
FIG. 26 is a top plan view showing another example of a short-circuit prevention structure using a structure for separating boundary lines and transparent electrode patterns.
Figure 27:
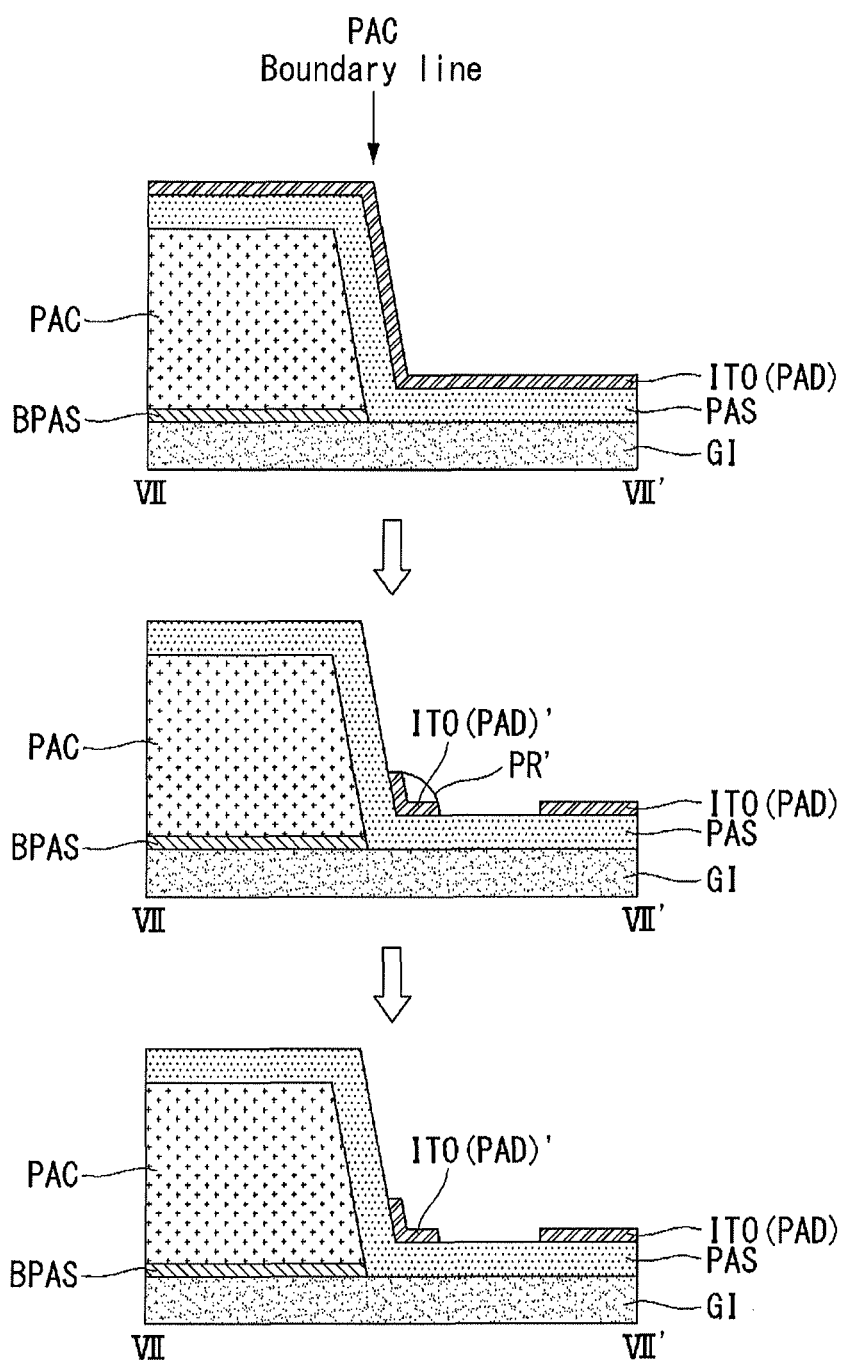
FIG. 27 is a cross-sectional view taken along line VII-VII' of FIG. 26.
Figure 28:
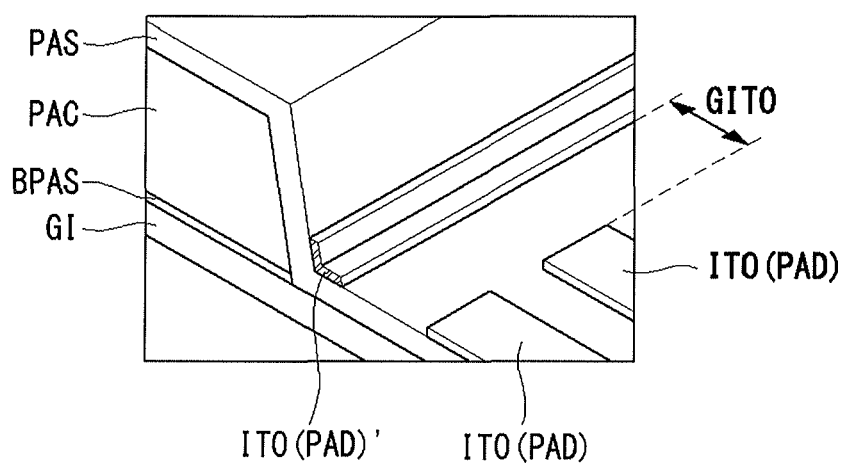
FIG. 28 is a perspective view showing the separation distance shown in FIG. 26.

FIG. 26 is a top plan view showing another example of a short-circuit prevention structure using a structure for separating boundary lines and transparent electrode patterns. FIG. 27 is a cross-sectional view taken along line VII-VII' of FIG. 26. FIG. 28 is a perspective view showing the separation distance shown in FIG. 26.

Referring to FIGS. 26 to 28, the transparent electrode patterns ITO (PAD) are formed to be separated from PAC boundary lines by a separation distance GITO when the transparent electrode material is patterned in the seventh photolithography process (FIG. 9h). The separation distance GITO may be properly set considering the design margin. Even if undesired conductive impurities are formed along the PAC boundary lines in the seventh photolithography process (FIG. 9h), the conductive impurities ITO (PAD)' and the normal transparent electrode patterns ITO (PAD)' are separated by the separation distance GITO, thereby preventing short-circuit problems.

As discussed above, the liquid crystal display of this invention can prevent defective bonding of the drive IC or FPC on the display panel covered with the organic passivation film and improve yield by completely removing the organic passivation film in the pad are where the drive IC and the FPC are bonded. Furthermore, the present invention can prevent a short-circuit between the wires on the boundary lines by forming holes in the upper passivation film on the boundary lines between the portion where the organic passivation film is present and the portion where the organic passivation film is not present, or applying a short-circuit prevention structure for separating the transparent electrode patterns from the boundary lines.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A liquid crystal display comprising:
an active area where data lines and gate lines cross each other and pixels are arranged in a matrix type; and
a pad area where a drive IC and an FPC are bonded to supply signals to the active area, the pad area comprising:
a first pad area where first pads connected to the data lines and bonded to output terminals of the drive IC are formed;
a second pad area where second pads bonded to input terminals of the drive IC are bonded; and
a third pad area where third pads bonded to output terminals of the FPC are formed,
where the second pads and the third pads are connected through wires, and
a part of the pad area, excluding the first pad area, second pad area, and third pad area, and the active area are covered with an organic passivation film,
wherein all the wires connected to the first pads in the first pad area are formed of first gate metal patterns which are formed on the substrate, and the first pad area comprises gate metal patterns, a gate insulating film covering the gate metal patterns, an upper passivation film formed on the gate insulating film, and first transparent electrode patterns that are formed on the upper passivation film and brought into contact with part of the gate metal patterns via first contact holes penetrating the upper passivation film and the gate insulating film, and,
metal jumping parts are formed between the second pad area and the third pad area, each metal jumping part comprising a source-drain metal pattern formed on the gate insulating film, a second transparent electrode pattern covering the source-drain metal pattern, and a third transparent electrode pattern connecting the gate metal pattern and the second transparent electrode pattern.

2. The liquid crystal display of claim 1, wherein the second and third pad areas each comprise fourth transparent electrode patterns formed on the gate insulating film so as to cover the source-drain metal patterns and fifth transparent electrode patterns that are brought into contact with part of the fourth transparent electrode patterns via second contact holes penetrating the upper passivation film and brought into contact with part of the gate metal patterns via third contact holes penetrating the gate insulating film, and
the upper passivation film formed on the second and third pad areas is formed on the gate insulating film so as to cover the fourth transparent electrode patterns.

3. The liquid crystal display of claim 2, wherein the organic passivation film is thicker than the gate insulating film, the buffer passivation film, and the upper passivation film.

4. The liquid crystal display of claim 2, wherein the pad area comprises holes that are formed in the upper passivation film along the boundary lines between the portion where the organic passivation film is present and the portion where the organic passivation film is not present, and expose layers under the upper passivation film.

5. The liquid crystal display of claim 2, wherein the transparent electrode patterns in the pad area are separated from the boundary lines between the portion where the organic passivation film is present and the portion where the organic passivation film is not present.

6. A method of fabricating a liquid crystal display comprising: an active area where data lines and gate lines cross each other and pixels are arranged in a matrix type; and a pad area where a drive IC and an FPC are bonded to supply signals to the active area,
the method comprising forming an organic passivation film in an active area and a part of a pad area,
the pad area comprising:
a first pad area where first pads connected to the data lines and bonded to output terminals of the drive IC are formed;
a second pad area where second pads bonded to input terminals of the drive IC are bonded; and
a third pad area where third pads bonded to output terminals of the FPC are formed,
where the second pads and the third pads are connected through wires, and
the part of the pad area, excluding the first pad area, second pad area, and third pad area, and the active area are covered with the organic passivation film,
wherein all the wires connected to the first pads in the first pad area are formed of first gate metal patterns which are formed on the substrate, and the first pad area comprises gate metal patterns, a gate insulating film covering the gate metal patterns, an upper passivation film formed on the gate insulating film, and first transparent electrode patterns that are formed on the upper passivation film and brought into contact with part of the gate metal patterns via first contact holes penetrating the upper passivation film and the gate insulating film,
further comprising forming metal jumping parts between the second pad area and the third pad area,
each metal jumping part comprising a source-drain metal pattern formed on the gate insulating film, a second transparent electrode pattern covering the source-drain metal pattern, and a third transparent electrode pattern connecting the gate metal pattern and the second transparent electrode pattern.

7. The method of claim 6, wherein the second and third pad areas each comprise fourth transparent electrode patterns formed on the gate insulating film so as to cover the source-drain metal patterns and fifth transparent electrode patterns that are brought into contact with part of the fourth transparent electrode patterns via second contact holes penetrating the upper passivation film and brought into contact with part of the gate metal patterns via third contact holes penetrating the gate insulating film, and
the upper passivation film formed on the second and third pad areas is formed on the gate insulating film so as to cover the fourth transparent electrode patterns.

8. The method of claim 7, wherein the organic passivation film is thicker than the gate insulating film, the buffer passivation film, and the upper passivation film.

9. The method of claim 7, further comprising forming holes in the upper passivation film along the boundary lines between the portion where the organic passivation film is present and the portion where the organic passivation film is not present, to expose layers under the upper passivation film,
wherein the holes are formed between the wires formed in the pad areas.

10. The method of claim 7, wherein the transparent electrode patterns in the pad area are separated from the boundary lines between the portion where the organic passivation film is present and the portion where the organic passivation film is not present.

11. A method of fabricating a liquid crystal display comprising: an active area where data lines and gate lines cross each other and pixels are arranged in a matrix type; and a pad area where a drive IC and an FPC are bonded to supply signals to the active area,
the method comprising:
forming a gate metal on a substrate in an active area and a pad area and patterning the same to form gate metal patterns in the active area and the pad area;
forming a gate insulating film in the active area and the pad area so as to cover the gate metal patterns in the active area and the pad area, forming a semiconductor layer over the gate insulating film, and patterning the same to form semiconductor patterns on the gate insulating film;

forming a source-drain metal in the active area and the pad area so as to cover the semiconductor patterns and patterning the same to form source-drain metal patterns in the active area and the pad area;

forming a buffer passivation film in the active area and the pad area so as to cover the source-drain metal patterns in the active area and the pad area, forming an organic passivation film over the buffer passivation film, and patterning the same to remove the organic passivation film from part of the pad area and leave the organic passivation film in the remaining pad area and the active area;

forming a transparent electrode material in the active area and the pad area and patterning the same to form first transparent electrode patterns in the active area and the pad area;

forming an upper passivation film in the active area and the pad area so as to cover the first transparent electrode patterns in the active area and the pad area and patterning the same; and forming a transparent electrode material in the active area and the pad area and patterning the same to form second transparent electrode patterns in the active area and the pad area, the pad area comprising:

a first pad area where first pads connected to the data lines and bonded to output terminals of the drive IC are formed;

a second pad area where second pads bonded to input terminals of the drive IC are bonded; and a third pad area where third pads bonded to output terminals of the FPC are formed, where the second pads and the third pads are connected through wires, the organic passivation film is completely removed from the first pad area, second pad area, and third pad area, and the remaining pad area, excluding the first pad area, second pad area, and third pad area, and the active area are covered with the organic passivation film.

12. The method of claim 11, wherein, in the removing and leaving of the organic passivation film, the organic passivation film and the underlying buffer passivation film are removed from the first pad area, second pad area, and third pad area, and the organic passivation film and the buffer passivation film remain in the remaining pad area and the active area, and source electrodes of thin film transistors are exposed via first contact holes penetrating the organic passivation film and the buffer passivation film in the active area, and the source-drain metal patterns are exposed in the second and third pad areas.

13. The method of claim 12, wherein, in the forming of the first transparent electrode patterns, the first transparent electrode patterns formed in the active area comprise pixel electrodes that are brought into contact with the source electrodes of the thin film transistors via the first contact holes, and the first transparent electrode patterns formed in the pad area comprise transparent electrode patterns covering the source drain metal patterns in the second and third pad areas.

14. The method of claim 13, wherein, in the forming and patterning of the upper passivation film, second contact holes penetrating the upper passivation film and exposing the transparent electrode patterns in the second and third pad areas and third contact holes penetrating the upper passivation film and the gate insulating film and exposing the gate metal patterns in the second and third pad areas are formed, and holes are formed in the upper passivation film along the boundary lines between the portion where the organic passivation film is present and the portion where the organic passivation film is not present, to expose layers under the upper passivation film.

15. The method of claim 14, wherein, in the forming of the second transparent electrode patterns, the second transparent electrode patterns formed in the active area comprise common electrodes to which a common voltage is supplied, the second transparent electrode patterns formed in the pad area comprise transparent electrode patterns that are brought into contact with the first transparent electrode patterns via the second contact holes in the second and third pad areas and brought into contact with the gate metal patterns via the third contact holes, and the second transparent electrode patterns formed in the pad area are separated from the boundary lines between the portion where the organic passivation film is present and the portion where the organic passivation film is not present.

16. The method of claim 15, wherein the organic passivation film is thicker than the gate insulating film, the buffer passivation film, and the upper passivation film.

* * * * *